United States Patent [19]

Petrusinsky

[11] 4,037,332
[45] July 26, 1977

[54] INFORMATION CONVERSION SYSTEM FOR ACCELERATED INSTRUCTION

[76] Inventor: Vyacheslav Vyacheslavovich Petrusinsky, ulitsa Malaya Jushunskaya, 8, korpus 2, kv. 51, Moscow, U.S.S.R.

[21] Appl. No.: 601,702

[22] Filed: Aug. 4, 1975

[51] Int. Cl.² .................................... G09B 19/06
[52] U.S. Cl. ................................. 35/35 C; 35/22 R
[58] Field of Search ............... 35/9 A, 22 R, 35 C; 128/2.1 B; 235/184, 78 RC; 273/1 E

[56] References Cited

U.S. PATENT DOCUMENTS 3,855,998 12/1974 Briceno .............................. 128/2.1 B
3,942,516 3/1976 Glynn et al. .......................... 35/22 R

OTHER PUBLICATIONS

Proceedings of the I.R.E.; "Electronic Sleep Teaching;" Jan. 1951; p. 160.
"Problems for Detecting Weak Reactions of the Nerve System;" edited by Fedotou, D. D.; Moscow, 1968.
Suggestology; G. K. Lozanov; Science and Art; Sofia, Bulgaria; 1971.
*Science News letter;* Oct. 1964; p. 275.
*Popular Electronics;* "Alpha Brain Waves & Biofeedback Training;" vol. 2, No. 6; Dec. 1972; pp. 33-38.
Popular Electronics; "Build An Alpha Brain Wave Feedback Monitor;" vol. 3, No. 1, Jan. 1973; pp. 40-45.
Popular Electronics; "Electronics & Brain Control;" vol. 4; No. 1; July, 1973; pp. 65-69.

*Primary Examiner*—Richard C. Pinkham
*Assistant Examiner*—Vance Y. Hum

[57] ABSTRACT

According to the invention, the proposed method of forming and converting information for accelerated instruction provides for multichannel recording of information on a carrier and simultaneous check instruction of a reference student. The method comprises forming audiovisual signals of basic and auxiliary study information, functional background signals, service signals, and test and instruction signals, working out a suggestive formula, converting the formed signals, recording the converted signals, synchronously with the rhythm of the reference student's physiological processes, on a carrier, and reproducing signals for the instruction of students whose reaction to test signals parameters are close to those of the reference student. The proposed system for effecting the method comprises a suggestive and subsensor control and reflex reinforcement unit, a delayed reinforcement unit, a signal converter, a unit for recording signals on a carrier, a biostimulation unit, a check reproduction unit, a response and biosignal unit, and a sensor unit. The invention raises the instruction effectiveness on the average by one order because of the reduction of the instruction period to a few days or weeks.

4 Claims, 32 Drawing Figures

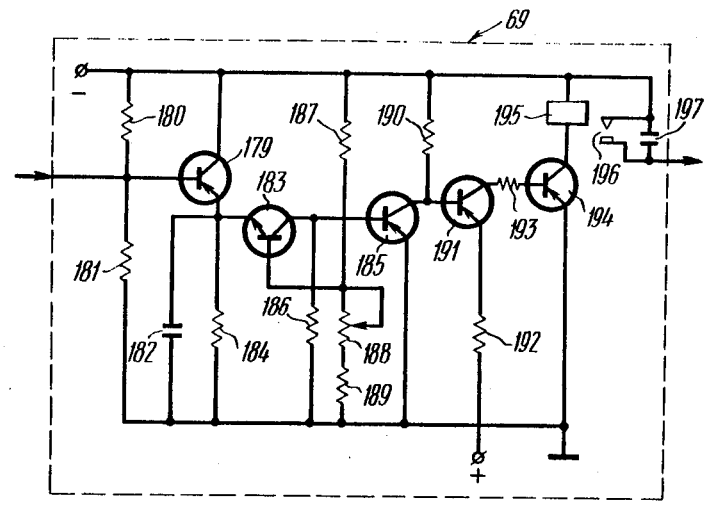
FIG. 23
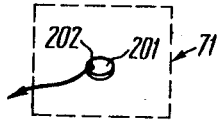
FIG. 24
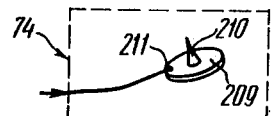
FIG. 27
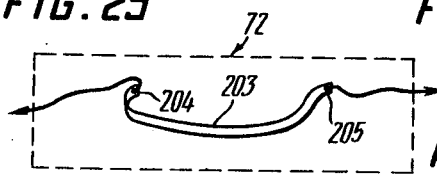
FIG. 25
FIG. 28
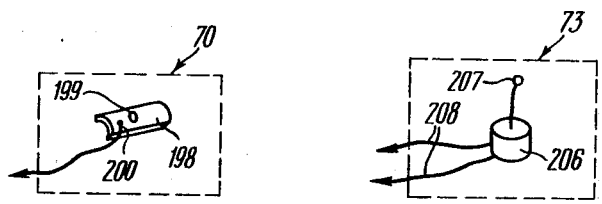
FIG. 26

INFORMATION CONVERSION SYSTEM FOR ACCELERATED INSTRUCTION

BACKGROUND OF THE INVENTION

The present invention relates to means for converting, forming, and recording on a carrier information for instruction and, more particularly, to methods of forming and converting information for accelerated instruction and systems for effecting these methods.

The invention is applicable for accelerated tutorless instruction in different subjects, including foreign languages.

At present, educators the world over are facing a problem which is partially solved by the claimed invention and which resides in seeking the possibilities for substantially intensifying the process of instruction without subjecting students to greater stresses and without using a tutor in the course of instruction. In view of the fact that the application of known technical means, in particular, programmed instruction means, has not considerably raised the effectiveness of instruction, the claimed invention displays a fundamentally new approach to the problem. According to the invention, information signals are formed with regard to optimizing psychophysiological conditions of their perception. Furthermore, the claimed invention generalizes, from the methodological viewpoint, the most rational of the known methods of intensified instruction, and suggestive and cybernetic control of students' state in the course of training.

For better understanding of the disclosure, we follow by explaining special terminology found elsewhere in the text.

Suggestive control implies acting upon the basic psychophysiological processes of a student by means of reproducing suggestive formula signals.

The suggestive formula means a combination of signals of speech instructions of suggestive control, in particular, programmed autotraining instructions causing subconscious psychophysiological reaction on the part of a student, the sequence of said instructions being determined by recording the effectiveness of their physiological influence upon changing the basic bioparameters of the student.

Subsensor control denotes control of a student's state through suggestive formula signals reproduced at or below the level of a student's conscious perception.

Suggestivity implies a student's capability of subconsciously reacting to suggestive and subsensor control signals.

Biostimulation implies the use of biologically meaningful stimuli to control a student's state.

Test signals are speech signals recorded on a carrier, which are psychophysiological and linguistic tests for determining the conscious perception threshold, speed of response, suggestivity, concentration, and memory performance, and the compatibility of signal presentation with perception characteristics of a student.

The suggestocybernetic method of accelerated instruction implies the methodology of instruction with the use of technical means and cybernetic methods and devices which provide for suggestive and subsensor transmission of information signals to a student, and suggestive and cybernetic control of the student's state in the course of instruction.

There is known a method for preparing and reproducing information for instruction, suggested by G. K. Lozanov (cf. G. K. Lozanov, Suggestology. Science and Art, Sofia, 1971). The method envisages compiling study aids, wherein instruction information is presented and reproduced in a suggestive form. Information is reproduced by a teacher in combination with background music. According to Lozanov's method, suggestive presentation of information is effected by introducing into an instruction program speech signals with a changing intonation, which ensure rhythmical presentation of information and spontaneous and two-level perception (perception at the conscious and subconscious levels) of study information speech signals conducive to a high emotional tone and psychological preparedness of a student for supermemorizing, in a play-type learning situation, speech signals which provide for spontaneity of learning and communication and stimulate perception in combination with a great mass of linguistic material reproduced by a teacher, as the student's state is changed from pseudopassive to active. Apart from employing services of a teacher, Lozanov's method makes use of technical means to mechanise the reproduction of study information, background music signals, service control commands, and test and instruction signals, which means incorporate standard technical units, such as study information units, a control and accompaniment signal unit, a test and instruction unit, an audiovisual unit intended for the presentation of main and auxiliary information signals, functional background signals, and test and instruction signals in a suggestive form. Lozanov's method has made it possible to raise the effectiveness of instruction on the average three-fold, as compared to conventional methods of instruction.

That notwithstanding, Lozanov's method cannot be reproduced by technical means alone, without employing in the course of instruction a teacher specially trained in a given subject. In the course of instruction based on Lozanov's method, signals of students' state are not objectively recorded, so the teacher has to make decisions as regards amendments in the program and introduce these amendments. Lozanov's method can only be carried out by specially trained educators who have mastered the method under Mr. Lozanov's personal guidance. All attempts to automate Lozanov's method have thus far failed.

It is an object of the present invention to provide of method of forming and converting information for accelerated instruction, and a system for effecting this method, which would make it possible to automate Lozanov's method, raise the effectiveness of instruction, with the use of technical means alone, on the average by one order, as compared to the conventional teaching techniques, substantially curtail learning time, optimize students' state, present information in a form adequate for perception, and use the proposed system for accelerated instruction based on suggestocybernetic techniques.

SUMMARY OF THE INVENTION

The invention comprises the basic steps of forming from educational aids initial synchronized audiovisual signals of main and auxiliary study information;

forming functional background audiovisual signals to the rhythm of a student's bioprocesses;

forming service control signals by subsequently reproducing signals recorded on a carrier;

forming test signals and instruction signals;

working out a suggestive formula and presenting it in the form of suggestive and subsensor control speech signals;

forming reflex reinforcement signals and suggestive and subsensor stimulation signals;

delaying in time, within the limits of a syntagma, the formed audiovisual signals of main and auxiliary study information and weakening their intensity to the perception threshold of a reference student;

linearly adding these signals to the initial audiovisual signals of main and auxiliary study information, functional background audiovisual signals, and subsensor and suggestive control and reflex reinforcement signals;

commutating the added signals in time and in relation to recording channels with suggestive and subsensor stimulation signals, suggestive control signals, instruction signals, and test signals with due regard for the reaction time of the reference student;

forming signals for biostimulating electrically active points on the reference student's body;

synchronizing the audiovisual signals of study information and suggestive and subsensor control, and functional background signals with the rhythm of the reference student's physiological processes;

registering responses and bioreactions of the reference student;

forming - from the formed audiovisual signals of main and auxiliary study information, functional background signals, suggestive and subsensor control signals, reflex reinforcement and suggestive and subsensor stimulation signals that have been filtered and delayed within a syntagma, study information signals weakened to the conscious perception threshold of the reference student, synchronized with the rhythm of bioprocesses of the reference student, commutated in time and in relation to channels — signals of passive information assimilation sessions, signals of activizing passive information store sessions, signals of sessions of assimilating information to the rhythm of bioprocesses, signals of programmed relaxation sessions, signals of suggestive stimulation sessions, signals of sensomotor instruction sessions, signals of biostimulation sessions, signals of suggestively controlled sleep sessions, and signals of programmed active rest sessions;

recording all the formed and converted signals on a carrier and simultaneously recording the reference student's responses and bioreactions;

using the signals recorded on the carrier, as the signals are being reproduced, for instruction of students whose performance as to the number of responses and the bioreactions to the test signals is similar to that of the reference student;

additionally converting the reference student's biosignals recorded on the carrier into signals for electrostimulation of a student's muscles;

using signals for electrostimulation of the student's muscles, as these signals are being reproduced, for stimulating the motor activity of students.

Another important aspect of the present invention is that it provides a system for forming and converting information for accelerated instruction with simultaneously instructing a reference student, which system comprises:

a study information unit intended for forming synchronized audiovisual signals of main and auxiliary study information;

a control signal and accompaniment signal unit intended for forming functional background signals and service signals for controlling the process of reproducing information signals;

a test and instruction unit;

an audiovisual unit intended for presenting signals of main and auxiliary study information, functional background signals and instruction signals in a suggestive form, inputs of said unit being connected to respective outputs of the study information unit, control and accompaniment signal unit, and test and instruction unit.

According to the invention, the proposed system is characterized in that it further includes:

a suggestive and subsensor control and reflex reinforcement unit of suggestive and subsensor signals, intended for forming audiovisual signals of subsensor and suggestive control from formed suggestive formulas recorded in the form of speech signals to form synchronized signals of reflex reinforcement of suggestive and subsensor formulas, and speech signals of suggestive and subsensor stimulation in the form of key speech signals, an output of the unit being connected to an input of the audiovisual unit;

a delayed reinforcement unit intended for delaying with time speech signals of main and auxiliary study information within the limits of a syntagma, filtering these signals in frequency and weakening them to the perception threshold of the reference student in accordance with the number of the reference student's responses to test signals, an input of the unit being connected to an output of the study information unit;

a signal converter intended for linearly adding the delayed, weakened, and filtered signals to signals of the audiovisual unit and signals of suggestive and subsensor control and reflex reinforcement of suggestive formulas, commutating in time all the added signals and directing them to converter channels with due regard for the number of the reference student's responses and the time of his reactions to test signals, one group of inputs of the signal converter being connected to outputs of the audiovisual unit, one of the inputs of the signal converter being connected to an output of the delayed reinforcement unit;

a unit for recording signals on a carrier, intended for recording on a carrier converted signals synchronously with the rhythm of physiological processes of the reference student and his bioreactions in the course of check instruction, inputs of the unit being connected to the multichannel output of the signal converter;

a biostimulation unit intended for stimulating electrically active points on the body of the reference student, an output of the unit being connected to an input of the unit for recording signals on a carrier;

a check reproduction unit intended for transmitting signals to the reference student for check instruction and for instructing students whose reaction to test signals parameters are close to those of the reference student, an input of the unit being connected to an output of the unit for recording signals on a carrier, output audiovisual signals being reproduced for the reference student;

a response and biosignal unit intended for registering the basic physiological processes of the reference student and his reactions to signals reproduced by the check reproduction unit, an output of the response and biosignal unit being connected to an input of the biostimulation unit;

a sensor unit intended for picking up bioinformation from the reference student and transmitting to him stimulating signal, one group of outputs of the unit being connected to inputs of the response and biosignal unit, one of its outputs being connected to an input of the biostimulation unit, a third output of the sensor unit being connected to an input of the unit for recording signals on a carrier, inputs of the sensor unit being connected to outputs of the check reproduction unit.

The invention makes it possible to substantially cut down the instruction period as a result of using the proposed method and the system for effecting that method. Compared to the conventional instruction methods, the method of the present invention produces equal results with the period of instruction being curtailed on the average by one order or even more. For example, 100 hours of instruction in a foreign language with the use of the proposed method and system (12 days of instruction with the use of the suggestocybernetic method of accelerated instruction) produce an effect which is on the whole equivalent to 1,000 hours of conventional instruction (which result is normally achieved in the course of 1.5 to 2 years of systematic studies at foreign language evening courses). Considering the fact that instruction costs in the case of using the method are roughly equivalent to those in the case of using conventional technical aids, it is clear that the use of the invention reduces the instruction costs by approximately one order.

BRIEF DESCRIPTION OF THE DRAWINGS

Other objects and advantages of the present invention will become more apparent from the following detailed description of a preferred embodiment thereof taken in conjunction with the accompanying drawings, wherein:

FIG. 23 is a key diagram of the threshold device 69 in accordance with the invention;

FIG. 24 is a representation of the electrocardiographic sensor 70 in accordance with the invention;

FIG. 25 is a representation of the electroencephalographic sensor 71 in accordance with the invention;

FIG. 26 is a representation of the pneumographic sensor 72 in accordance with the invention;

FIG. 27 is a representation of the movement sensor 73 in accordance with the invention;

FIG. 28 is a representation of the needle sensor 74 in accordance with the invention;

DESCRIPTION OF THE PREFERRED EMBODIMENTS

Figure 1:
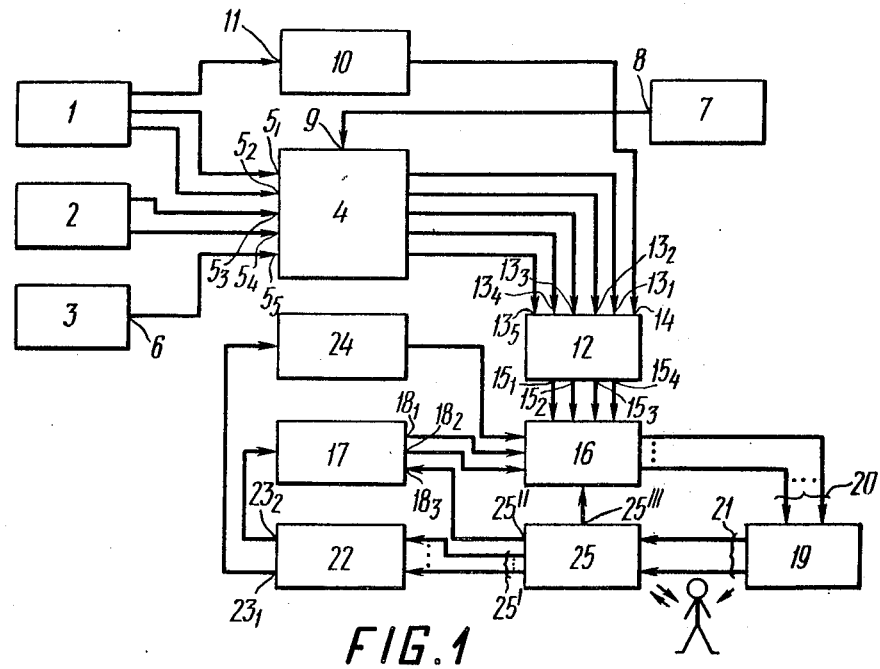
FIG. 1 is a block diagram of a system for effecting the method of forming and converting information for accelerated instruction in accordance with the invention.

Consider now the proposed method of forming and converting information for accelerated instruction and the system for effecting this method.

Referring to the accompanying drawings, the proposed system for forming and converting information for accelerated instruction comprises a study information unit 1 (FIG. 1) which is a standard video tape recorder or any studio video tape recorder and stereo tape recorder.

In the study information unit 1, study information is preliminarily recorded in the form of speech signals corresponding to visual signals in the form of texts, pictures, and symbols.

The system of the present invention further includes a control signal and accompaniment signal unit 2 which is a standard-type video stereo tape recorder and an audio frequency generator. This tape recorder may be any studio video tape recorder for example, the Electron-2 model manufactured in the USSR, the Jupiter-202-Stereo model, and the audio frequency generator of the ZG-10 model.

The system still further includes a test and instruction unit 3 composed of a similar video tape recorder and stereo tape recorder.

Next, the system includes an audiovisual unit 4. Inputs $5_1$ and $5_2$ of the unit 4 are connected to outputs of the study information unit 1.

Inputs $5_3$ and $5_4$ of the unit 4 are connected to outputs of the control signal and accompanying signal unit 2.

An input $5_5$ of the unit 4 is connected to an output 6 of the test and instruction unit 3.

According to the invention, the system for converting information for accelerated instruction comprises a unit 7 of suggestive and subsensor control and reflex reinforcement of suggestive and subsensor signals, which incorporates a video tape recorder and a stero tape recorder similar to those of the units 1, 2 and 3. An output 8 of the unit 7 is connected to an input 9 of the audiovosiual unit 4.

The proposed system includes a delayed reinforcement unit 10 whose input 11 is connected to an output of the study information unit 1, a signal converter 12 whose five inputs $13_1$, $13_2$, $13_3$, $13_4$, and $13_5$ are connected to outputs of the audiovisual unit 4. A sixth input 14 of the signal converter 12 is connected to an output of the delayed reinforcement unit 10. The signal converter 12 has four outputs $15_1$, $15_2$, $15_3$, and $15_4$.

The system includes a unit 16 for recording signals on a carrier, which unit is a standard multichannel tape recorder and video tape recorder whose inputs are connected to the respective outputs $15_1$, $15_2$, $15_3$, and $15_4$ of the signal converter 12.

The multichannel tape recorder may be any widescreen recorder. The video tape recorder may be any studio video recorder.

The system then includes a biostimulation unit 17 having outputs $18_1$ and $18_2$, and an input $18_3$. The outputs $18_1$ and $18_2$ of the unit 17 are connected to inputs of the unit 16 for recording signals on a carrier.

The proposed system also incorporates a check reproduction unit 19 composed of a reproduction audio tape recorder and video tape recorder similar to those of the unit 16, a multichannel input 20 of said unit being connected to a multichannel output of the unit 16 for recording signals on a carrier. The unit 19 has outputs 21.

The system comprises a response and biosignal unit 22 having two outputs $23_1$ and $23_2$. The output $23_2$ is connected to an input of the biostimulation unit 17.

The system may have a myostimulation unit 24 connected to the output $23_1$ of the response and biosignal unit 22.

The system includes a sensor unit 25 whose multichannel output 25' is connected to a multichannel input of the response and biosignal unit 22. Inputs of the unit 25 are connected to the outputs 21 of the check reproduction unit 19. An output 25" of the unit 25 is connected to the input $18_3$ of the biostimulation unit 17; an output 25''' is connected to the input of the unit 16.

The sensor unit 25 is connected to a reference student, the sensors of the unit 25 being attached to the reference student's body. The check reproduction unit 19 is also connected to the reference student and reproduces audiovisual signals and biostimulation and myostimulation signals for the reference student, the respective audio and video signals being reproduced in synchronization.

Consider now the individual units of the system.

The audiovisual unit 4 (FIG. 2) comprises two voltage dividers 26 and 27, and one adding matrixer 28. Three inputs of the adding matrixer 28 are connected to the inputs $5_1$, $5_3$, and $5_5$, respectively, of the audiovisual unit 4. An output of the matrixer 28 is connected to the output of the unit 4 coupled to the input $13_1$ of the unit 12. An input of the divider 26 is connected to the input 9 of the unit 4, its output being connected to a fourth input of the matrixer 28. An input of the divider 27 is connected to the input $5_5$ of the audiovisual unit 4, its output being connected to the output of the unit 4 coupled to the input $13_2$ of the unit 12.

The input $5_3$ of the unit 4 is also connected to the output of this unit coupled to the input $13_3$ of the unit 12.

The input $5_4$ of the unit 4 is connected to the output of this unit connected to the input $13_5$ of the unit 12.

The input $5_2$ of the unit 4 is connected to the output of this unit connected to the input $13_4$ of the unit 12.

Figure 3:
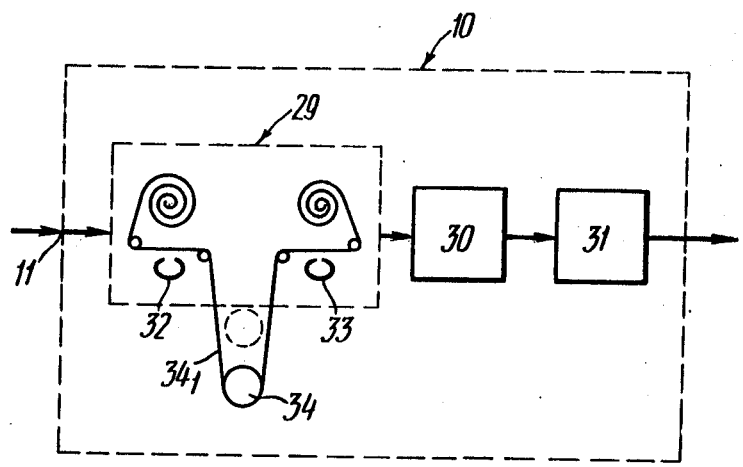
FIG. 3 is a block diagram of the delayed reinforcement unit in accordance with the invention.

The delayed reinforcement unit 10 (FIG. 3) comprises a unit 29 for delaying speech signals of main and auxiliary study information, a low-frequency suppression filter 30, and a controlled voltage divider 31. The delay unit 29 is built around a standard-type stereophonic tape recorder, for example, the Jupiter-20-2-Stereo model, wherein between recording and reproducing heads 32 and 33 there is formed, with the aid of a roller 34, a magnetic tape loop 34'. The roller 34 is movable, so that by changing its position and adjusting the length of the loop, one can adjust the delay time of speech signals of study information. An output of the delay unit 29 is connected to an input of the low-frequency suppression filter 30 whose output is connected to an input of the controlled divider 31. The controlled divider 31 makes it possible to weaken delayed signals down to 40 db. An output of the controlled divider 31 is connected to the output of the unit 10 connected to the input 14 (FIG. I) of the signal converter 12.

Figure 4:
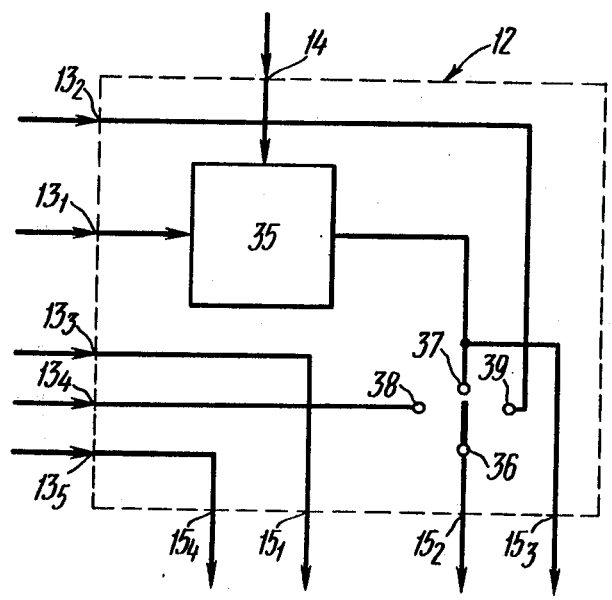
FIG. 4 is a block diagram of the signal converter in accordance with the invention.

The signal converter 12 (FIG. 4) comprises an adder 35 and a signal commutator 36. The adder 35 is an adding matrixer.

One input of the adder 35 is connected to the input $13_1$ of the unit 12, its outer input being connected to the input 14. An output of the adder 35 is connected to a contact 37 of the commutator 36. Two other contacts 38 and 39 of the commutator 36 are connected to the inputs $13_4$ and $13_2$, respectively, of the unit 12.

The output $15_1$ of the unit 12 is connected to the input $13_3$ of this unit; the output $15_2$ is connected to a break-make contact of the commutator 36; the output $15_3$ is connected to an output of the adder 35; the output $15_4$ is connected to the input $13_5$.

Figure 5:
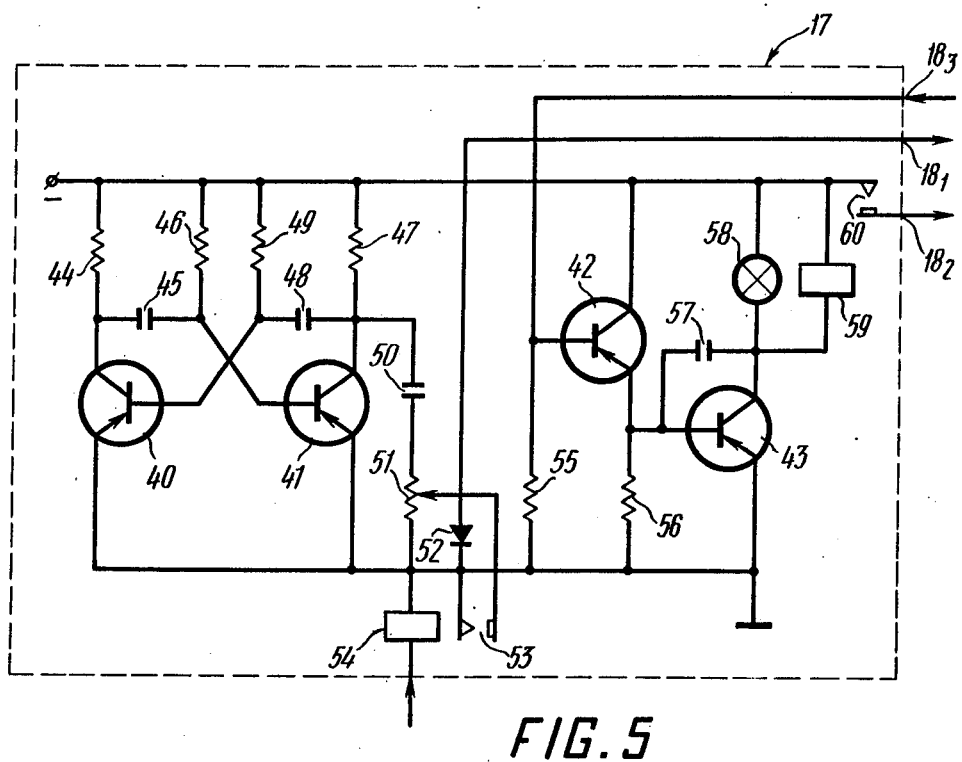
FIG. 5 is a key diagram of the biostimulation unit in accordance with the invention.

FIG. 5 is a key diagram of the biostimulation unit 17. The biostimulation unit 17 comprises a multivibrator built around transistors 40 and 41, and an indicator built around transistors 42 and 43. Connected to the collector circuit of the transistor 40 are a resistor 44 and one lead of a capacitor 45 whose other lead is connected to the base of the transistor 41 and a resistor 46. Connected to the collector circuit of the transistor 41 are a resistor 47 and one lead of a capacitor 48 whose second lead is connected to the base of the transistor 40 and a resistor 49. Also connected to the collector of the transistor 41 is one lead of a capacitor 50 whose second lead is connected to a variable resistor 51. The center tap of the variable resistor 51 is connected to the output $18_1$ of the unit 17, and the anode of a diode 52 whose cathode is connected to an earth bar; a third lead of the variable resistor 51 is connected to the earth bar.

Break contacts 53 of a relay 54 are connected to the anode and cathode of a diode 52. One lead of the relay 54 is connected to the input of the unit 17 connected to the output $23_2$ (FIG. 1) of the unit 22, a second lead of the relay 54 (FIG. 5) being connected to the earth bar. The base of the transistor 42 is connected to one lead of a resistor 55 and the input $18_3$ of the unit 17, a second lead of the resistor 55 being connected to the earth bar. The emitter of the transistor 42 is connected to the base of the transistor 43 and one lead of a resistor 56 whose second lead is connected to the earth bar. Electrically interposed between the collector and base of the transistor 43 in a capacitor 57. Also connected to the collector of the transistor 43 is one lead of a light indicator 58 and one lead of a relay 59 whose second lead is connected to the minus terminal of a power source. Make contacts 60 of the relay 59 are connected to the minus terminal of the power source and the output 18₂ of the unit 17.

Figure 6:
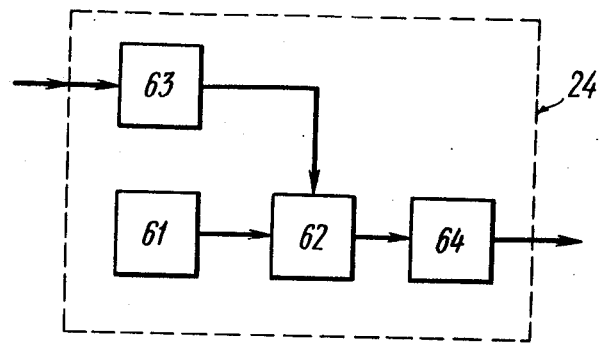
FIG. 6 is a block diagram of the myostimulation unit in accordance with the invention.

FIG. 6 is a block diagram of the myostimulation unit 24. A pluse generator 61 is connected to an input of a modulator 62 whose other input is connected to an output of a myosignal detector 63 whose input is connected to the input of the unit 24 connected to the output 23₁ (FIG. 1) of the unit 22. An output of the modulator 62 (FIG. 6) is connected to a power amplifier 64 whose output is connected to the output of the unit 24.

Figure 7:
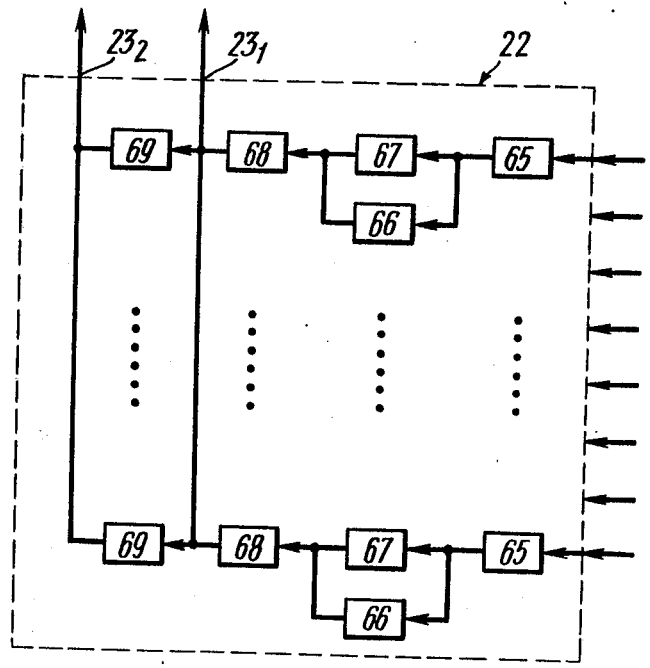
FIG. 7 is a block diagram of the response and biosignal unit in accordance with the invention.

FIG. 7 is a block diagram of the response and biosignal unit 22. The response and biosignal unit 22 has eight identical channels. FIG. 7 shows only the first and the last of these channels. The circuitry of each channel is as follows. An input of a biopotential amplifier 65 is connected to a respective input of the unit 22 connected the respective output 25' (FIG. 1) of the unit 25. An output of the biopotential amplifier 65 (FIG. 7), which is constructed as a low frequency amplifier, is connected to an input of an operational amplifier 66; placed in parallel with the latter, in the feedback circuit, is a band-pass filter 67 turned to frequencies of 8–12, 15–30 4–7, or 0.5–3 Hz which are the basic biorhythms of a student's electroencephalogram. An output of the operational amplifier 66 is connected to an input of an integrater 68 whose output is connected to the output 23₁ of the unit 22. Also connected to the output of the integrator 68 is an input of a threshold device 69 whose output is connected to the output 23₂ of the unit 22. One output of each of the eight identical channels of the unit 22 is connected to the output 23₁, whereas the other output of each of the eight channels is connected to the output 23₂.

Figure 8:
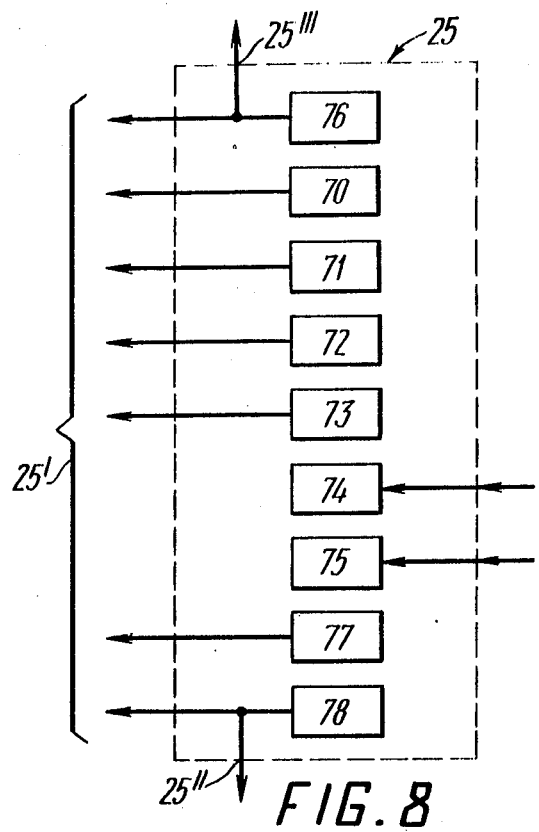
FIG. 8 is a schematic representation of the sensor unit in accorance with the invention.

FIG. 8 is a schematic representation of the sensor unit 25. The unit 25 incorporates standard contact sensors, including an electrocardiographic sensor 70, an encephalographic sensor 71, a pneumographic sensor 72, a movement sensor 73, a needle sensor 74, a heat effect sensor 75, a pushbutton actographic sensor 76, a myographic sensor 77, and a common electrode 78.

The sensors 70, 71, 72, 73, 76, 77, and 78 are connected to the respective outputs 25' of the unit 25. The common electrode 78 is connected to the output 25'' of the unit 25. The sensors 74 and 75 are connected to respective inputs of the unit 25. The sensor 76 is connected to the output 25''' of the unit 25.

The basic principles of recording bioprocesses with the aid of sensors used in the system of the present invention are described in the book by R. M. Bayevsky, "Physiologhicheskiye izmereniya v kosmose i problema ikh avtomatizatsii" ("Physiological Measurements in Outer Space and Ways to Automate Them"), Moscow, Nauka Publishers, 1971).

Figure 9:
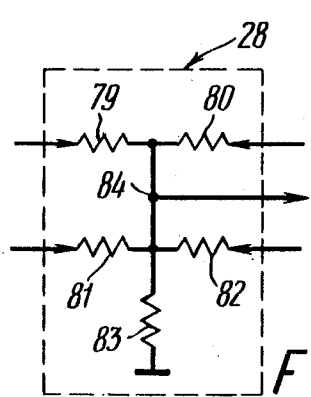
FIG. 9 is a key diagram of the adding matrixer 28 in accordance with the invention.

FIG. 9 is a key diagram of the adding matrixer 28. The matrixer 28 is built around resistors 79, 80, 81, 82, and 83. One lead of each of the resistors is connected to a common point 84 connected to the output of the matrixer 28. The other leads of the resistors 79, 80, 81, 82, and 83 are connected to the respective inputs of the matrixer 28. A second lead of the resistor 83 is connected to an earth bar.

Figure 10:
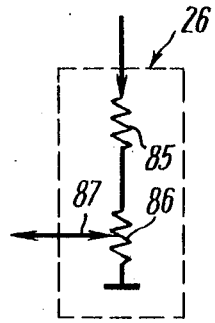
FIG. 10 is a key diagram of the voltage divider 26 in accordance with the invention.

FIG. 10 is a key diagram of the voltage divider 26 which incorporates a resistor 85 is connected to the input of the divider 26, its other lead being connected to a lead of the variable resistor 86 whose center tap 87 is connected to the output of the divider 26, a second lead of the variable resistor 86 being connected to an earth bar.

Figure 11:
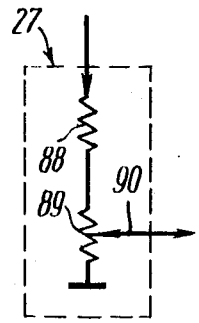
FIG. 11 is a key diagram of the voltage divider 27 in accordance with the invention.

FIG. 11 is a key diagram of the voltage divider 27 incorporating a resistor 88 and a variable resistor 89 that are placed in parallel. One lead of the resistor 88 is connected to the input of the divider 27. A denter tap 90 of the variable resistor 89 is connected to the outputs of the divider 27. A third lead of the variable resistor 89 is connected to an earth bar.

Figure 12:
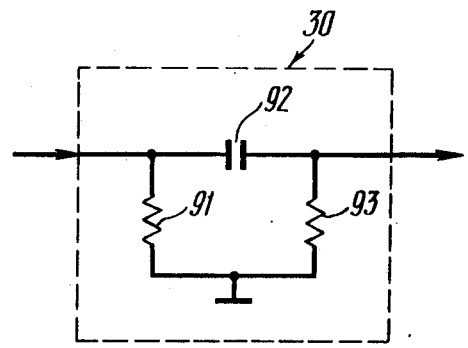
FIG. 12 is a key diagram of the low frequency suppression filter 30 in accordance with the invention.

FIG. 12 is a key diagram of the low frequency suppression filter 30 which includes a resistor 91, a capacitor 92, and a resistor 93. One lead of the resistor 91 is connected to a lead of the capacitor 92. The point of connection of the resistor 91 and the capacitor 92 is connected to the input of the filter 30.

A second lead of the capacitor 92 is connected to one lead of the resistor 93, the point of connection of the capacitor 92 and the resistor 93 being connected to the output of the filter 30. Second leads of the resistors 91 and 93 are connected to the earth bar.

Figure 13:
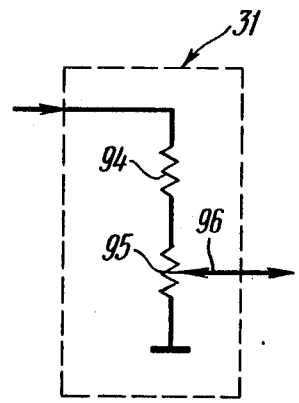
FIG. 13 is a key diagram of the controlled voltage divider 31 in accordance with the invention.

FIG. 13 is a key diagram of the controlled voltage divider 31 built around a resistor 94 and a variable resistor 95 placed in series. One lead of the resistor 94 is connected to the input of the controlled voltage divider 31, its second lead being connected to a lead of the variable resistor 95. A center tap 96 of the resistor 95 is connected to the output of the controlled voltage divider 31. A third lead of the resistor 95 is connected to the earth bar.

Figure 14:
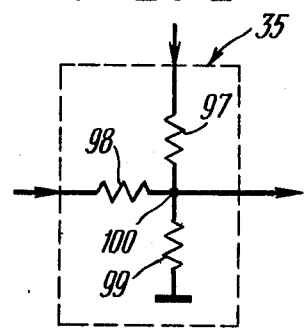
FIG. 14 is a key diagram of the adder 35 in accordance with the invention.

FIG. 14 is a key diagram of the adder 35 built around resistors 97, 98, and 99. One lead of each of the resistors is connected to a common point 100 which is connected to the output of the adder 35. Other leads of the resistors 97 and 98 are connected to the respective inputs of the adder 35. A second lead of the resistor 99 is connected to an earth bar.

Figure 15:
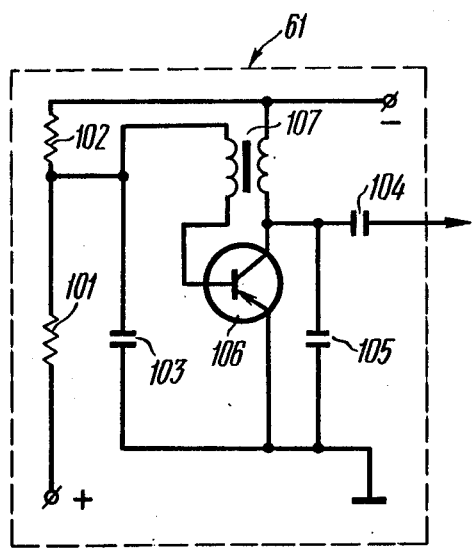
FIG. 15 is a key diagram of the pulse generator 61 in accordance with the invention.

FIG. 15 is a key diagram of the pulse generator 61 incorporating resistors 101, 102, capacitors 103, 104, and 105, a transistor 106, and a transformer 107. The resistors 101 and 102 are placed in series, their point of connection being also connected to the primary winding of the transformer 107. Other leads of the resistors 101 and 102 are connected to the positive and negative terminals of the power source, respectively. Also connected to the point of connection of the resistors 101 and 102 is the capacitor 103 whose second lead is connected to the earth bar. A second lead of the primary winding of the transformer 107 is connected to the base of the transistor 106 whose emitter is connected to the earth bar. The collector of the transistor 106 is connected to one lead of the secondary winding of the transformer 107, one lead of the capacitor 105, and one lead of the capacitor 104. A second lead of the capacitor 104 is connected to the output of the pulse generator 61, whereas a second lead of the capacitor 105 is connected to the earth bar.

Figure 16:
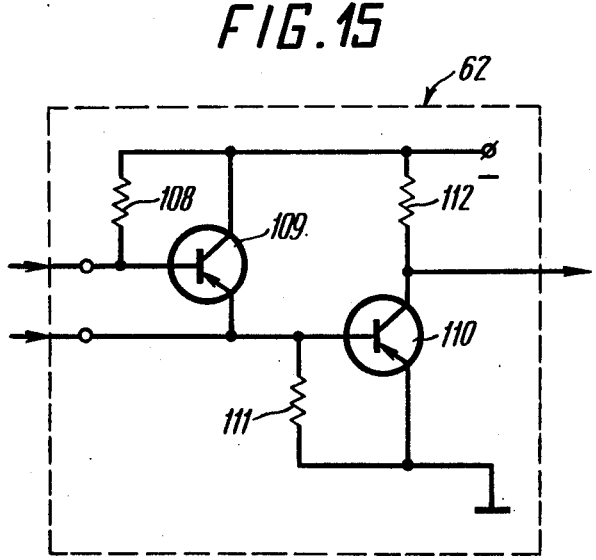
FIG. 16 is a key diagram of the modulator 62 in accordance with the invention.

FIG. 16 is a key diagram of the modulator 62, A resistor 108 of the modulator 62 is connected to the latter's input and to the base of a transistor 109. A second lead of the resistor 108 is connected to the negative terminal of the power source. Also connected to the negative terminal of the power source is the collector of the transistor 109. The second input of the modulator 62 is connected to the base of a transistor 110. The base of the transistor 110 is also connected to the emitter of the transistor 109 and one lead of a resistor 111 whose second lead is connected to the earth bar. The collector of the transistor 110 is connected to a resistor 112 and the output of the modulator 62. A second lead of the resistor 111 is connected to the negative terminal of the power source.

Figure 17:
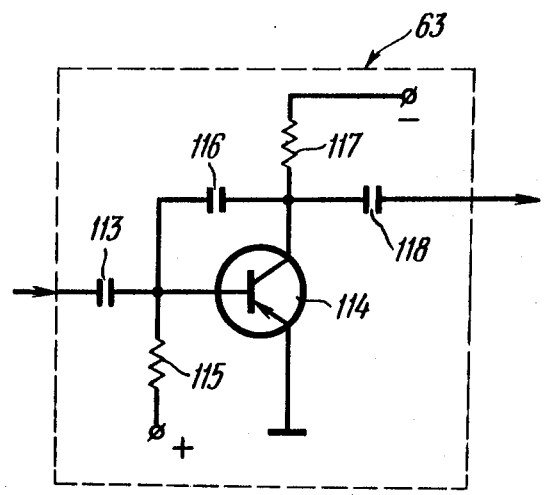
FIG. 17 is a key diagram of the detector 63 in accordance with the invention.

FIG. 17 is a key diagram of the detector 63. The input of the detector 63 is connected to a lead of a capacitor 113 whose second lead is connected to the base of a transistor 114 and a resistor 115. A second lead of the resistor 115 is connected to the positive terminal of the power source. Placed between the collector and base of the transistor 114 is a capacitor 116. The emitter of the transistor 114 is connected to the earth bar. The collector of the transistor 114 is connected to a lead of a resistor 117 whose second lead is connected to the negative terminal of the power source and one lead of a capacitor 118 whose second lead is connected to the output of the detector 63.

Figure 18:
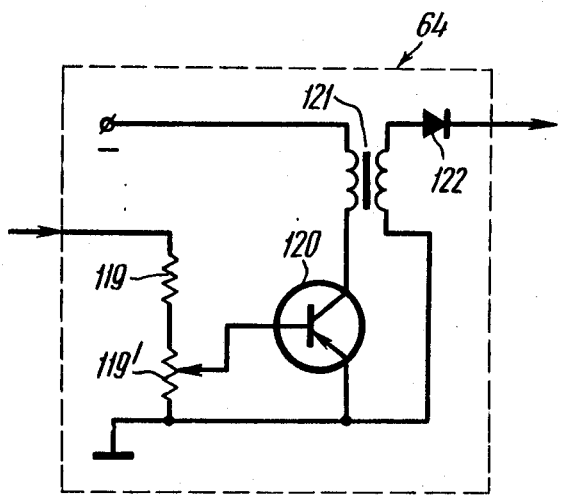
FIG. 18 is a key diagram of the power amplifier 64 in accordance with the invention.

FIG. 18 is a diagram of the power amplifier 64. The input of the amplifier 64 is connected to one lead of a resistor 119 whose second lead is connected to one lead of a variable resistor 119'. The center tap of the variable resistor 119' is connected to the base of a transistor 120, its third lead being connected to the earth bar. The collector of the transistor 120 is connected to a primary winding of a transformer 121, a secondary lead of the primary winding being connected to the negative terminal of the power source. One lead of the secondary winding of the transformer 121 is connected to the anode of a diode 122 whose cathode is connected to the output of the power amplifier 64. A second lead of the secondary winding of the transformer 121 is connected to the earth bar.

Figure 19:
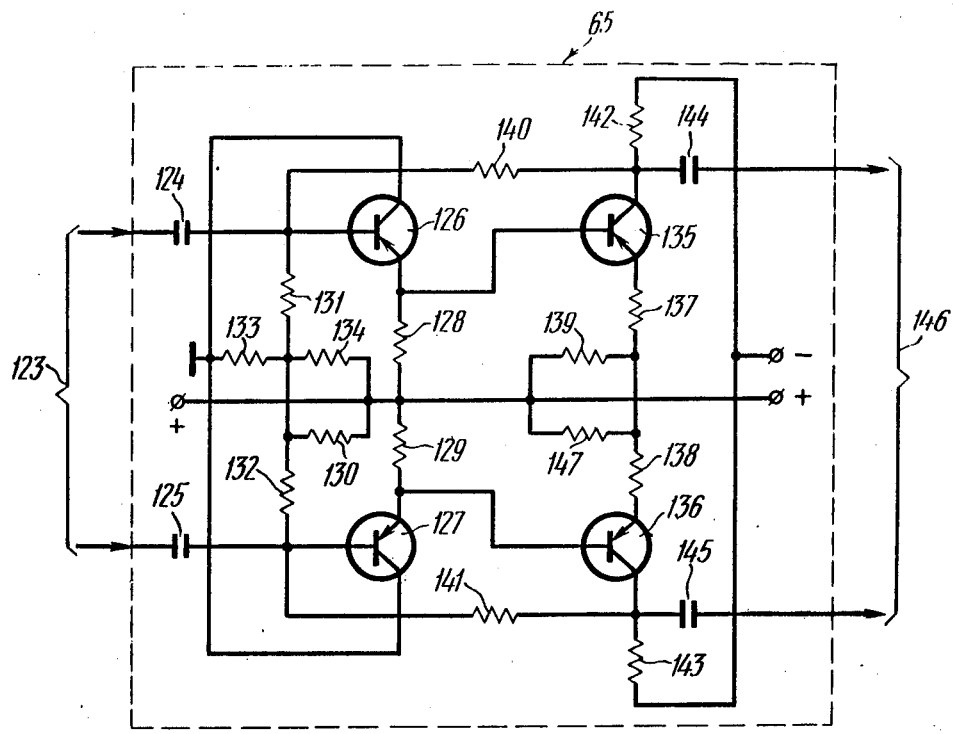
FIG. 19 is a key diagram of the biopotential amplifier 65 in accordance with the invention.

FIG. 19 is a key diagram of the biopotential amplifier 65. A symmetrical input 123 of the biopotential amplifier is connected to one lead of each of capacitors 124 and 125 whose second leads are connected to the bases of transistors 126 and 127, respectively. The collectors of the transistors 126 and 127 are connected to the earth bar. The emitters of the transistors 126 and 127 are connected to resistors 128 and 129, respectively. Resistors 128 and 129 are placed in series, their point of connection being connected to the positive terminal of the power source and one lead of a thermistor 130.

The bases of the transistors 126 and 127 are connected to resistors 131 and 132 that are placed in series. The point of connection of the resistors 131 and 132 is connected to one lead of a resistor 133 whose second lead is connected to the earth bar. The point of connection of the resistors 131 and 132 is also connected to the thermistor 130 and one lead of a resistor 134 whose second lead is connected to the positive terminal of the power source. The emitters of the transistors 126 and 127 are connected to the bases of transistors 135 and 136, respectively. The emitters of the transistors 135 and 136 are connected to resistors 137 and 138 that are placed in parallel, the point of connection of resistors 137 and 138 being connected to one lead of a resistor 139 whose second lead is connected to the positive terminal of the power source.

The collectors of the transistors 135 and 136 are connected to respective leads of resistors 140 and 141 whose second leads are connected to the bases of the transistors 126 and 127, respectively. The collectors of the transistors 135 and 136 are also connected to respective leads of resistors 142 and 143 whose second leads are connected to the negative terminal of the power source.

The collectors of the transistors 135 and 136 are also connected to respective leads of capacitors 144 and 145 whose second leads are connected to a symmetric output 146 of the bipotential amplifier 65.

A thermistor 147 is placed in parallel with the resistor 139.

Figure 20:
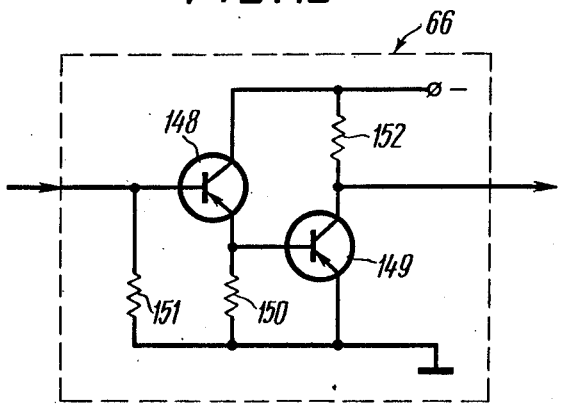
FIG. 20 is a key diagram of the operational amplifier 66 in accordance with the invention.

FIG. 20 is a key diagram of an operational amplifier 66. The input of the operational amplifier 66 is connected to the base of a transistor 148 whose emitter is connected to the base of a transistor 149 and one lead of a resistor 150 whose second lead is connected to the earth bar.

Connected to the base of the transistor 148 is one lead of a resistor 151 whose second lead is connected to the earth bar.

The collector of the transistor 148 is connected to the negative terminal of the power source.

Connected to the collector of the transistor 149 is one lead of a resistor 152 whose second lead is connected to the negative terminal of the power source.

The emitter of the transistor 149 is connected to the earth bar.

The collector of the transistor 149 is also connected to the output of the operational amplifier 66.

Figure 21:
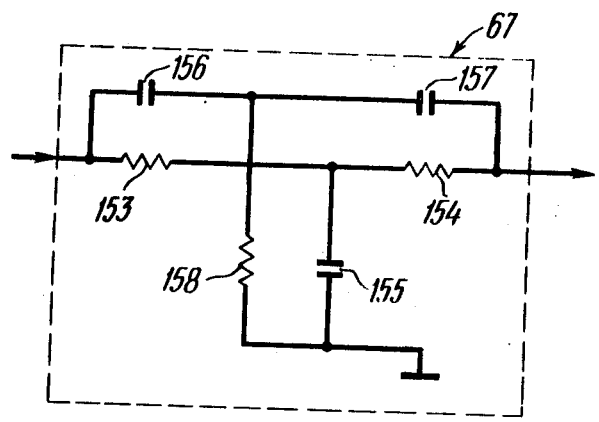
FIG. 21 is a key diagram of the band-pass filter 67 in accordance with the invention.

FIG. 21 is a key diagram of the band-pass filter 67. The input of the band-pass filter 67 is connected to one lead of a resistor 153 whose second lead is connected to one lead of a resistor 154 and one lead of a capacitor 155.

A second lead of the resistor 154 is connected to the output of the band-pass filter 67. A second lead of the capacitor 155 is connected to the earth bar. Also connected to the input of the band-pass filter 67 is one lead of a capacitor 156 whose second lead is connected to one lead of a capacitor 157.

A second lead of the capacitor 157 is connected to the lead of the resistor 154 connected to the output of the band-pass filter 67.

The common point of connection of the capacitors 156 and 157 is connected to one lead of a resistor 158 whose second lead is connected to the earth bar.

Figure 22:
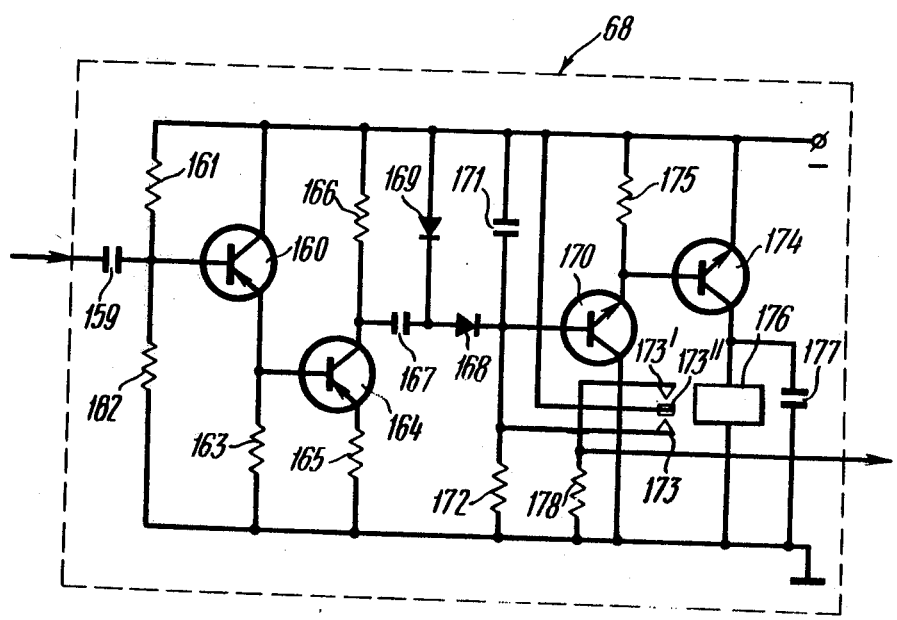
FIG. 22 is a key diagram of the integrator 68 in accordance with the invention.

FIG. 22 is a diagram of the integrator 68. The input of the integrator 68 is connected to one lead of a capacitor 159 whose second lead is connected to the base of a transistor 160 and one lead of a resistor 161 whose second lead is connected to the negative terminal of the power source. Connected to the base of the transistor 160 is one lead of a resistor 162 whose second lead is connected to the earth bar.

The collector of the transistor 160 is connected to the negative terminal of the power source. The emitter of the transistor 160 is connected to a resistor 163 whose second lead is connected to the earth bar.

Also connected to the emitter of the transistor 160 is the base of a transistor 164.

The emitter of the transistor 164 is connected to one lead of a resistor 165 whose second lead is connected to the earth bar. The collector of the transistor 164 is connected to one lead of a resistor 166 whose second lead is connected to the negative terminal of the power source. Also connected to the collector of the transistor 164 is one lead of a capacitor 167 whose second lead is connected to the anode of a diode 168 and the cathode of a diode 169. The anode of the diode 169 is connected to the negative terminal of the power source. The cathode of the diode 168 is connected to the base of a transistor 170, a capacitor 171, a resistor 172, and a relay contact 173.

A relay contact 173' is connected to the input of the integrator 68.

A relay armature 173" is connected to the negative terminal of the power source.

The emitter of the transistor 170 is connected to the base of the transistor 174 and a resistor 175. The collector of the transistor 174 is connected to a relay winding 176 which is placed in parallel with a capacitor 177. The relay contact 173 is also connected to a resistor 178.

FIG. 23 is a key diagram of the threshold device 69. The input of the threshold device 69 is connected to the base of a transistor 179, and resistors 180 and 181 whose leads are connected to the negative terminal of the power source and the earth bar, respectively. Interposed between the emitter of the transistor 179 and the earth bar is a capacitor 182. The emitter of the transistor 179 is connected to the emitter of a transistor 183 and a resistor 184 whose second lead is connected to the earth bar. The collector of the transistor 183 is connected to the base of a transistor 185 and a resistor 186. The base of the transistor 183 is connected to a resistor 187 and two leads of a variable resistor 188 whose third lead is connected to a resistor 189. The collector of the transistor 185 is connected to a resistor 190 and the base of a transistor 191. The emitter of the transistor 191 is coupled via a resistor 192 to the positive terminal of the power source. The collector of the transistor 91 is a coupled via a resistor 193 to the base of a transistor 194. The collector of the transistor 194 is connected to a winding 195 of the relay whose making contacts 196 are connected to the output of the threshold device 69. Placed in parallel with the relay contacts 196 is a capacitor 197.

FIG. 24 is a schematic representation of the electrocariographic sensor 70 which is a contact electrode 198 having a fixture 199 and a lead conductor 200.

FIG. 25 is a schematic representation of the electroencephalographic sensor 71 which is a contact electrode 201 having a lead 202.

FIG. 26 is a schematic representation of the pneumographic sensor which is a strip of an elastic current-conducting material 203 having leads 204 and 205.

The movement sensor 73 (FIG. 27) is an electromechanical converter 206 having an inertia head 207 and leads 208.

The needle sensor 74 (FIG. 28) comprises a contact 209 and a needle 210 which are connected to a lead 211.

Figure 29:
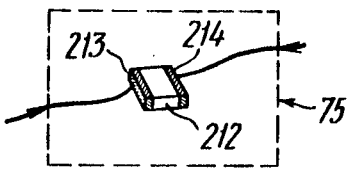
FIG. 29 is a representation of the heat action sensor 75 in accordance with the invention.

The heat effect sensor 75 (FIG. 29) comprises a plate 212 of a current-conducting high-resistance material, and contacts 213 and 214 to secure the leads.

Figure 30:
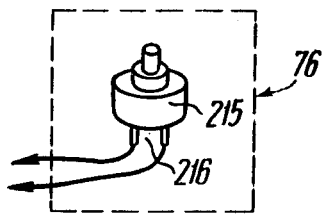
FIG. 30 is a representation of the pushbutton sensor 76 in accordance with the invention.

The pushbutton actogram sensor 76 (FIG. 30) is a microbutton 215 provided with contact leads 216.

Figure 31:
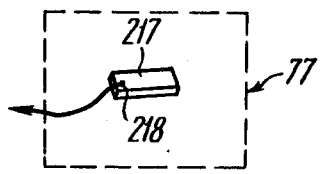
FIG. 31 is a representation of the myographic sensor 77 in accordance with the invention.
Figure 32:
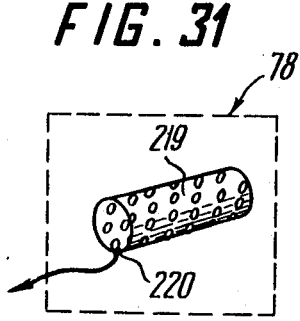
FIG. 32 is a view of the common electrode 78 in accordance with the invention.

The myogram sensor 77 (FIG. 31) is a hollow metal tube 219 with a conductor 220 serving as a lead.

The proposed method of forming and converting information for accelerated instruction and the proposed system for effecting this method are intended for forming, converting and recording information signals for accelerating instruction with the use of the suggestocybernetic method. The proposed method and system enable students to master without a tutor such subjects as typewriting, fast reading, shorthand, exact sciences and the humanities in the course of a few days (3 to 10 days); the invention also makes it possible to cover a foreign language course within a few weeks (2 to 6 weeks).

After completing this course, students can well understand a spoken foreign language, can easily read and translate at sight unadapted fiction and exerpts from popular science literature, as well as newspapers and magazines, political essays and articles in their speciality. Students can also speak and write in the foreign language of their choice.

The use of the proposed method and the system for effecting this method improves the general state and efficiency of a student taught in autotraining; the invention also helps to cultivate and maintain the spirit of creative endeavor.

The formation of signals, and the conversion and recording of information by the proposed systems are effected in the course of check instruction of a reference student. Selected as reference students are persons having normal basic bioparameters: such persons must also be capable of perceiving no less than 80 percent of the test signal reproduced by the system.

The basic test for selecting a reference student for check instruction in a foreign language is the presentation of audiovisual signals in the form of initial language lessons accompanied by suggestive and subsensor control signals, as well as by recording the student's responses and biosignals.

The information thus recorded can be used for teaching other students whose test performance is commensurable with that of the reference student. Instruction of large groups of students requires a collection of signal recordings (information recordings) compiled in the course of check instruction of reference students having different test performances which, however, are superior to those of the individual students of the group.

The basic operating principle of the system for effecting the proposed method, as this system is used for forming converting and recording information, as well as for check instruction of a reference student, is as follows.

Prior to an instruction session, the device is given an overall check. This is followed by reproducing psychophysiological test signals which are transmitted to a reference student. Simultaneously, the student's responses to tests and his biosignals are recorded. The reaction to test signals is indicative of memory characteristics, the level of concentration, perception thresholds, and suggestivity of the student; it also indicates the basic rhythms of the student's physiological processes. Depending upon the above-mentioned data, there are transmitted to the reference student signals of suggestive and subsensor control and reflex reinforcement, as well as biostimulation signals which control the state of the reference student. The presence of a required state is checked by means of recording the student's bioreaction. As soon as the required state of the reference student has been achieved, study information starts being reproduced, which is accompanied by functional background signals (background music to the rhythm of the student's basic bioprocesses). To facilitate the student's perception, study information signals are delyed in time in the course of instruction and filtered. This is followed by linearly adding these signals to the same signals of initial study information, functional background signals, and subsensor control signals. The converted signals are directed to respective channels and commutated in time, in which form they are recorded and simultaneously reproduced for the reference student in accordance with the latter's perception characteristics. Video and audios signals are converted and reproduced in synchronization. As the reference student's state deviates from the one corresponding to the suggestive and subsensor control formula, the signals indicating the change are recorded by sensors and analyzed, after which an auxiliary subsensor control program is brought into play. As soon as all the parameters get back to normal, study information is again transmitted in combination with functional background signals, and subsensor and suggestive control signals. Operating conditions of the system are selected depending upon the reference student's perception thresholds, as well as upon the recorded number of his responses to the test signals so that the subsensor signals are at or below the conscious perception threshold.

In the course of the entire check instruction of the reference student, the maintenance of the system, as well as the selection and adjustment of operating conditions and controlling the recording of converted information signals on the carrier are all done by one operator irrespective of the subject being taught.

The duration of one recording session is normally about one hour. One day of suggestocybernetic training includes on the average 7 to 8 hours of lessons recorded with different study information signals and different ways of signal presentation.

The suggestocybernetic method of accelerated instruction incorporates the following basic types of learning sessions:

passive assimilation sessions, when signals of main and auxiliary study information are presented for passive memorization;

sessions of the activization of passively assimilated linguistic material, when study information is reproduced in the form of assignments and questions for sensory perception, whereas key speech signals and speech response signals are reproduced at the perception level;

controlled relaxation sessions (programmed autotraining sessions), when only suggestive and subsensor signals are reproduced throughout the sessions;

suggestively controlled sleep sessions during which there are reproduced suggestive and subsensor signals for controlling the student's state;

sessions of presenting audiovisual study information to the rhythm of the bioprocesses, when study information signals are reproduced to the rhythms of the breathing, the dominating electroencephalographic frequency, and the pulse of the student;

biostimulation sessions, when during the entire session there is effected biostimulation of electrically active points on the reference student's body, which is accompanied by recording the signals as to the state of the reference student and additional suggestive and subsensor stimulation;

assimilation check sessions, when signals of the main study information are reproduced without any auxiliary study information (in the case of learning a foreign language, without simultaneous interpretation);

sensomotor instruction sessions, when study information is presented in a suggestive form for controlling the motor activity of the reference student in combination with electrostimulation of the muscles (this applies, in particular, to teaching writing, shorthand, and typewriting);

active programmed rest sessions including instruction signals, an audiovisual entertainment program, and a music-and-color program, which alternate with learning sessions.

In teaching a foreign language, speech signals of main study information are presented in the foreign language, whereas speech signals of auxiliary study information are given in the student's mother tongue.

For sessions to be held during the first days of a foreign language course, speech signals, including suggestive subsensor and instruction signals, as well as all study information signals, are formed in the student's mother language. For study sessions during the last days of the course, these signals are presented exclusively in the foreign language, so the student finds himself in an appropriate linguistic environment During each learning session, study information is presented in the form of large masses of information, covering the entire contents of instruction aids used in the process. On the average, one suggestocybernetic instruction sessions may contain 10 to 100 times as much information as is presented at a lesson with the use of the conventional teaching techniques. During the instruction cycle each learning session is reproduced about 3 to 5 times on different days, depending upon the assimilation and test performance of the student.

Consider now operation of the proposed system and the essentials of the method of the present invention.

To explain the system's operation, there is given hereinbelow an example of recording one session of learning a foreign language.

Prior to recording the session by the test and instruction unit 3 (FIG. 1), there are reproduced equipment tuning signals to ensure required operating conditions and set audiosignal levels for normal perception. Simultaneously, the study information unit 1, the control and accompaniment unit 2, and the unit 7 of suggestive and subsensor control and reflex reinforcement reproduce signals for tuning the system. The delayed reinforcement unit 10 delays study information within the intonational lexical unit, i.e. the syntagma, filters the low frequencies, and changes the delayed signal level to that of the reference student's perception threshold. The audiovisual unit 4 effects linear addition of the audiovisual signals. The response and biosignal unit 22 operates in this case in the calibration mode and controls the operation of the biostimulation unit 17. The signal converter 12 effects check commutation and conversion of signals; the unit 16 for recording signals on a carrier records the entire information; the check reproduction unit 19 effects check reproduction of the converted audiovisual information. After checking the system, the reference student's state is checked. For this purpose, the test and instruction unit 3 reproduces speech signals of psychophysiological and linguistic tests in combination with speech signals of suggestive and subsensor control and reflex reinforcement formulas. The formula of test speech signals is worked out to establish the basic perception characteristics of the reference student. The response and biosignal unit 22 records the reference student's responses to speech test signals and speech subsensor signals presented at different levels and with different signal-to-noise ratios. The number of the reference student's responses recorded by the response and biosignal unit 22 characterizes the conscious perception threshold of the reference student, as well as his associative memory, preparedness for autotraining, and concentration level. The biosignals recorded by the unit 22 (an electroencephalogram, electrocardiogram, pneumogram, and actogram) reveal the basic rhythms of the reference student's bioprocesses and make it possible to appropriately select functional background music to the rhythm of the reference student's basic bioprocesses; these biosignals also make it possible to select suggestive and subsensor control speech signals to the rhythm of the reference student's bioprocesses.

Upon the end of the test signal sequence, the signal converter 12 sends to the unit 16 signals of suggestive and subsensor control and reflex reinforcement selected by the operator in accordance with the reference student's number of responses and the time of his reaction to test signals, as well as in accordance with the rhythm of his bioprocesses. Simultaneously, there are transmitted, via the unit 16 for recording signals on a carrier and the sensor unit 25, signals for biostimulating the electrically active points on the reference student's body.

Reflex reinforcement signals serve to bring into action physical stimuli which are a reflex reinforcement of the suggestive formula. For example, a suggestive formula as to changing the audio or light sensitivity of the reference student is followed by a reflex reinforcement signal which incorporates the same signals reproduced at a lower level.

As this takes place, there is tranmistted via the service signal channel and recorded an audio signal (a sinusoidal auido frequency signal) generated by the audio frequency generator, which signal, when reproduced, brings into play a physical reinforcement signal (for instance, a light or heat source, etc.) which serves as a reflex reinforcement of the suggestive or subsensor speech signal.

The cycle of controlling the reference student's state being completed, the state of the reference student is rechecked by again transmitting test and instruction signals from the test and instruction unit 3, which is accompanied by recording the reference student's bioreactions with the aid of the sensor unit 25. If the required changes in the reference student's bioprocesses have been achieved (reduced pulse and breathing rate, and an increase in the amplitude of the frequency components in the reference student's electroencephalogram to 8 to 30 Hz), the operator starts feeding study information reproduced by the study information unit 1. If no required changes in the reference student's bioprocesses have been effected, the cycle of controlling the reference student's state is repeated until the required changes are attained. After the end of the cycle of controlling the reference student's state, the study information unit 1 is brought into operation and reproduces, via the units 4, 12, 16, and 19, basic and auxiliary study information for the reference student, together with functional music background signals to the rhythm of the reference student's bioprocesses, reproduced by the unit 2 of control and accompaniment signals in the form of audio and visual signals of music-and-color, and also together with service signals for reproduction control, reproduced by the same unit 2, subsensor control signals reproduced by the unit 7 of suggestive and subsensor control and reflex reinforcement. Simultaneously, the response and biosignal unit 22 records the reference student's reactions to the study information signals.

In the case of a foreign language, the basic contents of the audiovisual study signals at different learning sessions are as follows.

During passive assimilation sessions, instruction information signals are formed as signals of basic study information, i.e. as audio speech signals in the foreign language with simultaneous translation (the auxiliary study information). Superimposed on these signals are subsensor control speech signals are functional background music signals to the rhythm of the student's basic bioprocesses; there are also formed synchronized visual signals which are presented as parallel texts (in the foreign language provided with a translation), drawings, and symbols with subsensor control signals and music-and-color signals superimposed on the image. Visual subsensor control signals are presented in the form of suggestive word formulas (like "cheerfulness", "freshness", "brightness", "joy"), the letters of the suggestive formulas being deformed and given against the background of different lines, symbols and other images which tend to distract attention.

During sessions of activization of passive linguistic material (spoken language lessons), audio signals are formed as spoken translation signals at the sensory (conscious) perception level; superimposed upon these signals are background music signals to the rhythm of the student's bioprocesses, and subsensor control signals delayed by a period of time determined by the reaction speed of the reference student. Visual signals are formed as parallel texts made up of complete linguistic units (complete phrases, dialogues, and texts), wherein the text of the translation is presented at the sensory perception level, whereas the parallel translation is given at the perception threshold level. During some sessions, spoken translation may be replaced by drawings and symobls. During sessions of activization of passive linguistic material, the student interprets out load a text into the foreign language and checks the translation by percepting delayed subsensor signals in the foreging language, which are a correct version of translation.

During passive assimilation sessions and sessions of activization of passively assimilated material, the entire study information (including grammar) is presented in the form of complete linguistic units, examples, tables, and symbols with parallel translation (without explaining the rules).

The reproduction of the study information is periodically interrupted by test signals which are reproduced by the unit 3 and transmitted to the reference student via the units 4, 12, 16, and 19. Simultaneously, the units 25 and 22 record the reference student's bioprocesses. If the reference student produces a lesser number of responses over the last period of presenting study information, which number is recorded by the movement sensor 73 (FIG. 8) and actogram sensor 76 of the sensor unit 25 (FIG. 1), if the electroencephalogram reveals an increase in the amplitude of the frequency components of 0.5 to 7 Hy, and if, finally, there is observed a prolonged reaction to the test signals, the transmission of the test signals is followed by an additional program of suggestive and subsensor control and reinforcement transitted from the unit 7, after which the study information unit 1 continues to reproduce the study information.

In the course of a teaching a foreign language, study information at passive assimilation sessions is reproduced in the form of speech signals in the foreign language. These signals are presented suggestively and are accompanied by simultaneous interpretation. As this takes place, study information signals are delayed, filtered, and weakened within the intonational lexical unit, the syntagma, by the delayed reinforcement unit 10. Then, these signals are added by the converter 12 to the initial study information signals whose level is determined by the operator depending upon the number of the reference student's responses to test signals and his conscious perception threshold. During sessions of activization of passively assimilated material, speech signals of assignments and questions are reproduced via the sensory perception (above the level of the reference student's conscious perception threshold) channel. Key speech signals, or answers (suggestive and subsensor stimulation signals), are reproduced at the perception threshold level evaluated from the number of responses to test signals in the course of measuring the perception threshold, and can be heard by the student through earphones. The recording of a study session is ended by supplying concluding instruction signals and a concluding program of suggestive and subsensor control and reflex reinforcement, reproduced by the unit 7.

The operator uses the service control signal channel (the input $5_4$ of the unit 4) to record service signals in the form of audio signals corresponding to unit switching instructions and instructions for sending reflex reinforcement signals. Also recorded are spoken signals of the operator on duty, which are necessary for subsequently using the given recording to control the reproduction of the recorded signals in the course of instruction. Audio signals are coded by frequenices of 100, 4,000, 5,000, 7,000, and 10,000 Hz and supplied by the operator as the latter brings into operation the units 1, 2, 3, and 7, respectively. If there is the necessity of reflex reinforcement of the suggestive formula reproduced by the unit 7, the operator records an audio signal of 10,000 Hz. In reproducing this signal in the course of instruction, the signal actuates a source of a physical stimulus (for example, and infrared source) which serves for reflex reinforcement of the suggestive formula. The operator's spoken signals are recorded within the telephone channel range of 300 – 3,400 Hz.

In the course of sessions of reproducing study information signals to the rhythm of the student's bioprocesses, video signals are formed to the rhythm of the dominating frequency of the encephalogram (10 Hz), as separate words provided with translation, each next word being shown on a screen one line below the previous word. A new series of lines is formed at a heartbeat frequency (60 to 70 Hz), whereas the meaning of the word being reproduced changes at the breathing rate (12 to 18 changes per minute). Superimposed upon the image are video signals of subsensor control and music-and-color signals; audio signals are functional music synchronized with the video signal, with subsensor control signals being superimposed thereon. At different learning sessions, the presentation of information to the rhythm of bioprocesses may be effected by transmitting separate words with parallel translation to the heartbeat rhythm is synchronization through the audio and visual channels. Superimposed upon these words are subsensor control signals and functional music-and-color reproduced to the rhythm of bioprocesses, as well as presentation of complete linguistic units. The latter are also presented to the rhythm of breathing and are accompanied by subsensor signals and functional music-and-color signals, the transmission being effected synchronously through both the audio and visual channels.

During active programmed rest sessions, audio signals are presented in the form of spoken suggestive formulas and instructions, whereupon there are superimposed subsensor signals and functional music, as well as songs in the foreign language reproduced to the rhythm of bioprocesses. Video signals are presented as music-and-color signals. Some sessions take the form of entertainment films in the foreign language with superimposed audiovisual subsensor signals.

During sessions of relaxation and suggestively controlled sleep, audiosignals are presented in the form of spoken suggestive and subsensor formulas in the foreign language with simultaneous translation, whereupon there are superimposed subsensor control signals (speech and noise signals) and background music to the rhythm of the sleeping student's bioprocesses. Video signals are synchronized music-and-color signals which are also reproduced to the rhythm of the sleeping student's bioprocesses. The concluding part of the session, which is the toning-up part, includes background and subsensor audiovisual signals reproduced to the rhythm of bioprocesses of a man in the state of wakefulness marked by an increased capacity for work. Sessions of relaxation and suggestively controlled sleep are held in special premises, the student reclining in an armchair with a collpasible back, or lying in bed.

During sessions of electrically stimulating the electrically active points on the reference student's body and sessions of electrically stimulating the student's muscles, stimulation signals are recorded on magnetic tape in the form of a multichannel recording of respective pulses generated by the electrostimulation unit 17 and the myostimulation unit 24, in combination with sinchronous audiovisual signals of suggestive and subsensor control, an audiovisual functional background reproduced to the rhythm of the electrostimulation signals, and spoken instruction signals. The electrostimulation signals are reproduced by the check reproduction unit 19 (FIG. 1) and are directed to the sensors (the needle sensor 74 (FIG. 8), the heat effect sensor 75, the muscle electrostimulation sensor 77, and the common electrode 78). The audiovisual signals are reproduced synchronously by the check reproduction unit 19 (FIG. 1). Electrically stimulated are "roborant" and "toning-up" point described in a book by V. G. Vagralik, "Chen-tzu Therapy", Gorky, 1962 (in Russian).

Thus, the conversion and recording on a carrier of audiovisual information for accelerated instruction with simultaneous check instruction of a reference student comprises the steps of forming from instruction aids initial synchronized audiovisual signals of main and auxiliary study information;

forming audiovisual signals of functional background, service control signals, test signals and instruction signals; and — reproducing in the course of instruction information signals in a suggestive form.

The process further includes:

working out a suggestive formula and presenting it in the form of speech signals of suggestive and subsensor control;

forming reflex reinforcement signals and signals of suggestive and subsensor stimulation;

frequency-filtering the information audio signals;

delaying in time the initial audiovisual signals within the limits of a syntagma;

changing their intensity to the perception threshold depending upon the number of the reference student's responses to test signals;

adding these signals to the initial audiovisual signals, audiovisual functional background signals, suggestive and subsensor control and reflex reinforcement signals;

commutating these signals in time and with reference to the recording channels with signals of suggestive and subsensor stimulation, suggestive control signals, instruction signals, test signals, and tuning signals, with due regard for the number of responses and the time of reaction of the reference student to test signals;

forming biostimulation signals;

recording the converted signals on a carrier sinchronously with the rhythm of the reference student's physiological processes together with biostimulation signals and service control signals; using the signals, as they are reproduced, for instructing students whose reaction to test signal parameters are close to those of the reference student.

In the course of reproduction, the reference student's biosignals recorded on the carrier may be additionally converted into signals for electrostimulating the student's muscles. They are also employed for stimulating the motor activity of the student.

In the course of forming, converting and recording information signals, and in the course of check instruction of the reference student, the individual units of the system operate as follows.

The study information unit 1 (FIG. 1) carries out preliminary formation, preparation and recording of audiovisual study programs. Employed as the initial materials of the basic study information are existing taped or audiovisual courses in the form of magnetic tape recordings or records and visual instruction aids. Instruction phonograms are recordings of speech signals (dialogues, sketches, and texts). Visual instruction aids are books, diafilms, and films completed with texts, drawings, and symbols, and having play-type plots. Preliminary recording of study information is carried out in order to prepare and record additional study information which is a simultaneous interpretation and parallel visual (typed) translation of the basic study information. Audiosignals of the axuliary study information are recorded through the synchronous audio channel of the tape recorder of the study information unit 1. Visual signals are registered in the form of a parallel typed text of the translation.

Study information which is to be reproduced to the rhythm of bioprocesses is formed as a glossary provided with a translation.

The control and accompaniment signal unit 2 prepares and records in advance accompaniment signals, i.e. functional background music, which signals are recorded synchronously with music-and-color signals. Used for the purpose are stereophonic light music recordings played at a tempo of man's basic bioprocesses (heartbeat, the rhythm of the dominating frequency of the electroencephalogram, and the breathing rate). Separately selected are pieces played to the rhythm of man's bioprocesses in the state of relaxation (the cerebral biocurrent rhythm, 1 to 10 Hz; breathing rate, 10 to 14 cycles per minute; and heartbeat rhythm, 50 to 70 per minute), and in the state of high-tone wakefulness (the cerebral biocurrent rhythm, 10 to 30 Hz; breathing rate, 15 to 20 cycles per minute; and heartbeat rate, 70 to 90 per minute). These audiovisual accompaniment signals are used to prepare instruction sessions.

The test and instruction unit 3 prepares in advance a set of speech instructions for all types of sessions, as well as a program of the instruction course. It further prepares audiovisual test signals in the form of audio and speech signals of the basic and auxiliary study information, and visual parallel text signals. An instruction provides complete guidelines for a student's activites during the entire course of instruction and rules out any interference into the instruction process on the part of a teacher. In the case of foreign language studies, instructions are compiled in a respective foreign language and provided with simultaneous translation.

The basic content of an instruction for a passive assimilation session is a command for the student to listen to a foreign text and translation and simultaneously follow parallel texts on the screen. The student is expected to try to understand, but not memorize, words and phrases, and register with the aid of the pushbutton actogram sensor 76 (FIG. 8) all the lexical units that can be easily translated by the student. During passive assimilation sessions it is suggested that the student mentally repeat all the foreign phrases he understands.

The basic content of an instruction for a session of activization of passively assimilated material is a command to listen to out-loud interpretation of phrases, that the student is already familiar with, in the language of the translation, and follow respective drawings and texts on the screen (the latter also being in the language of the translation). The student then must translate each phase repidly and out loud into the foreign language, registering each phrase he pronounces by pushing the button of the actogram sensor 76. It is further suggested that the student check the correctness of his pronounciation by listening to a delayed translation signal sent to his earphones, and by percepting translation audiovisual signals in the form of threshold audiovisual signals.

The basis content of instructions for an assimilation check session or a session of feeding information to the rhythm of bioprocesses is a command to flow an audio and visual text, registering with the aid of the pushbutton sensor 76 all the words and linguistic units effectively assimilated up to the given moment.

Psychophysiological and linguistic test signals are recorded in advance by the test and instruction unit 3 (FIG. 1). Psychophysiological tests are recordings of speech test signals. Specifically, tests for suggestivity and preparedness for autotraining include tests for relaxation, catalepsy, amnesia, and auditory and visual hallucinations. These are described in the collected works under the heading "Problemy obnaruzheniya slabykh reaktsiy nervnoy sytemy"/"Problems of Detecting Weak Reactions of the Nervous System"/ under the general direction of Prof. D. D. Fedotov, edited by V. V. Petrusinsky, Ped. Cand., Moscow, 1968. Tests for determining conscious perception thresholds are recordings of speech signals of main and auxiliary study information, whereupon there are superimposed functional background signals or noise signals reproduced at different volumes and different noise-to-signal ratios. The conscious perception threshold corresponds to a situation when the reference student recognizes 50 percent of the linguistic units being reproduced. Qualitatively, it is characterized by the presence of bioreactions, registered by the actogram sensor 76 (FIG. 8) and the movement sensor 73, to 50 persignals being reproduced. Reaction speed tests are recordings of speech signals of auxiliary study information (translation) and key speech signals of basic study information, recorded with different time lags with respect to the translation signals. The reaction speed is determined from the time lag of the key signals synchronously with which the student pronounces the speech signals in the course of tests.

Linguistic tests are recordings of study information speech signals in the form of initial language lessons employed in the course of instruction in combination with visually presented texts in the foreign language provided with a translation. These also include vocabulary material recordings reproduced to the rhythm of the heartbeat. As test signals are being reproduced for the reference student, the sensors record the student's reactions to these signals. Qualitative assessment of the psychophysiological tests is based on counting the number of the reference student's reactions registered by the actogram sensor 76, the movement sensor 73, and the electroencephalographic sensor 71. Qualitative evaluation of the linguistic tests is based upon counting the reactions registered by the actogram sensor 76. Reactions of recognizing linguistic units and reactions of recognizing individual words are assessed separately. Only those persons are considered fit for check instruction who react to at least 80 percent of linguistic and psychophysiological tests.

The signals that have been prepared by the study information unit 1 (FIG. 1), the control and accompaniment signal unit 2, and the test and instruction unit 3 are combined to make up sets of recordings. Each of these recordings may be selected and reproduced by the operator at the required moment in the course of converting information signals and carrying out check instruction of the reference student.

As the operator applied output signals from the study information unit 1, the control and accompaniment signal unit 2, and the test and instruction unit 3 to the adder 28 (FIG. 2) of the audiovisual unit 4, there takes place linear addition of audio or video signals. The audiovisual unit 4 is intended for presenting signals of main and auxiliary study information, functional background music signals, and test and instruction signals in an suggestive form. The suggestive form of presenting information by the audiovisual unit 4 is ensured by the presence at its outputs of several signals which, after being added together, present in combination at the output of the unit signals that are percepted by the reference student both at the conscious and subconscious levels.

Figure 2:
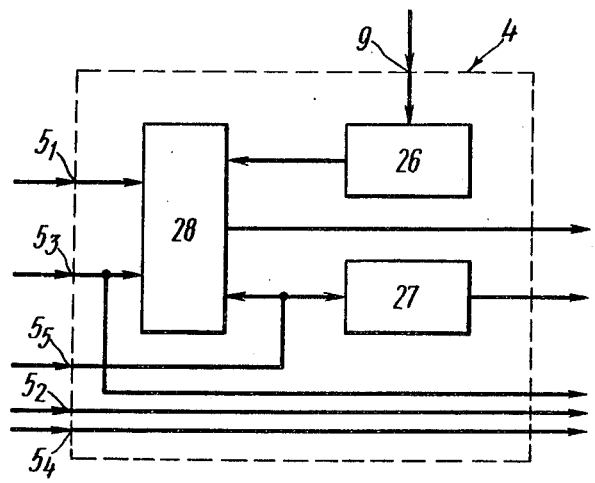
FIG. 2 is a block diagram of the audiovisual unit in accordance with the invention.

Applied to the four inputs of the adder 28 (FIG. 9) are electric signals intended for linear addition. Each electric signal applied to an input of the adder 28 is forwarded to the voltage divider composed of one of the resistors 79, 80, 81 or 82 and the resistor 83. Each electric signal causes a voltage drop across the resistor 83. As electric signals are simultaneously applied to all the inputs, a total voltage drop is observed across the resistor 83. Thus, picked up from the resistor 83 connected to the common point 84 is a total signal which is applied at the output of the adder 28. From the output of the adder 28 the added signals are directed to the output of the unit 4 (FIG. 2). Applied to the input of the divider 26 are signals from the unit 7 (FIG. 1) of suggestive and subsensor control and reflex reinforcement.

The unit 7 carries out preliminary recording of the following signals:

audio speech signals presented in a suggestive form. These signals are recorded in accordance with earlier compiled suggestive formulas which are a combination of suggestive control instructions (programmed autotraining and auto-suggestion formula instructions). The suggestive control speech signals are recorded (in the foreign language and with simultaneous translation) for all types of session included in the instruction course. The operator is capable of reproducing any required formula in the course of instruction;

subsensor audio signals of suggestive control. As these signals are subsequently reproduced, the reproduction level is selected to correspond to the conscious perception threshold of the reference student. A test for determining the conscious perception threshold is the presence of 50 percent of responses (biosignals) on the part of the reference student to signals of tests for determining the conscious perception threshold, which responses are registered by the response and biosignal unit 22;

emotionally meaningful, toning-up noise signals (for example, laughter, bird singing, etc.) which are used for subsensor control in combination with audio speech signals;

visual subsensor control signals which present suggestive formula texts in the form of distorted letters against a background of lines and symbols concealing the letters, which background tends to distract attention;

synchronized signals of reflex reinforcement of suggestive and subsensor formulas;

speech signals of suggestive and subsensor stimulation in the form of key speech signals;

reflex reinforcement signals.

Reflex reinforcement of suggestive formulas is effected by a delayed change of the parameters of signals recorded by the unit 7. Following a suggestive formula as to a change in the light and auditory sensitivity of the reference student, the audiovisual signals applied from the unit 7 are reproduced at a lower level.

Simultaneously with the delayed change in the parameters of the signal reproduced by the unit 7, the unit 2 records, through the service signal channel, a service signal (an audio signal at a frequency of 10,000 Hz), which signal brings into play, in the course of reproducing the recording, one of physically reinforcing stimuli (a light or heat source, etc.) which serves as a physical reinforcement of the suggestive or subsensor formula.

Suggestive and subsensor stimulation in the form of key speech signals is effected in the form of speech signals of main study information. The content of the speech signals of main study information is speech study information signals which are answers or linguistic keys to speech signals of auxiliary study information. The content of speech signals of auxiliary study information in the present case is assignments or questions. The suggestive and subsensor stimulation signals (basic study information signals) are reproduced with a time lag relative to the signals of auxiliary study information, determined in the course of tests, and are reproduced at a signal level corresponding to the conscious perception threshold of the reference student, which is also determined in the course of tests.

The divider 26 (FIG. 2) weakens the signals applied from the output of the unit 7 in accordance with the conscious perception threshold of the reference student, in order to apply the signals to the converter 12 (FIG. 1).

Applied to the input of the divider 26 (FIG. 10) is a signal which is then applied to the voltage divider composed of the resistor 85 and the variable resistor 86. Depending upon the position of the crusor 87 of the variable resistor 86, voltage is divided in proportion to the ratio between the resistance of the variable resistor 86 and the sum total of the resistances of the resistor 85 and the variable resistor 86. From the cursor 87 of the variable resistor 86, the signal is applied to the output of the divider 26.

The divider 27 (FIG. 2) weakens the signals applied thereto from the output of the test and instruction unit 3 (FIG. 1) and matches the level of these signals with the output signals of the audiovisual unit 4.

Applied to the input of the divider 27 (FIG. 11) is a signal which is applied to the voltage divider composed of the resistor 88 and the variable resistor 89. Depending upon the position of the cursor 90 of the variable resistor 89, voltage is divided in proportion to the ratio between the resistance of the variable resistor 89 and the sum total of the resistances of the variable resistor 89 and the resistor 88. From the cursor 90 of the variable resistor 89, the signal is applied to the output of the divider 27.

The unit 10 (FIG. 3) delays with time the speech signals of main and auxiliary study information within a syntagma, filters these signals in frequency, and weakens them to the conscious perception threshold of the reference student in accordance with the number of responses of the reference student to test signals.

The unit 10 operates as follows. Applied to the input of unit 10 is a signal from the study information unit 11, The signal is then directed to the delay unit 29 (FIG. 3) which is a standard-type tape recorder. From the output of the unit 29, the signals that have been delayed within the limits of a syntagma are filtered in low frequencies by the filter 30 and weakened by the controlled divider 31 to the conscious perception threshold level of the reference student. From the output of the controlled divider 31, the weakened signals are applied to the output of the unit 10 and then to the converter 12 (FIG. 1).

A speech signal from the output of the unit 29 is applied to the input of the filter 30 (FIG. 12).

For better perception of speech signals the filter 30 suppresses the low frequencies (to 800 Hz) of the speech signals applied thereto. The speech signal sent to the input of the filter 30 is applied to the resistor 91. The resistor 91 matches the input resistance of the filter 30 with the output resistance of the delay unit 29. The resistance of the resistor 91 is selected to be equal to the output resistance of the delay unit 29.

The capacitor 92 and the resistor 93 make up a frequency-dependent voltage divider. The transmission factor of the voltage divider raises with an increase in the frequency of the speech signal applied to the input of the filter 30.

Hence, low-frequency signals applied to the input of the filter cause a slight voltage drop at its output. High-frequency signals cause a great voltage drop at the output. Thus, applied to the input of the filter 30 is a signal with a great high-frequency level and suppressed low frequencies.

Applied to the input of the controlled divider 31 (FIG. 13) is a signal which is applied to the voltage divider composed of the resistor 94 and the variable resistor 95. Depending upon the position of the cursor 96 of the variable resistor 95, voltage is divided in proportion to the ratio between the resistance of the variable resistor 95 and the sum total of the resistances of the resistor 94 and the variable resistor 95. From the cursor 96 of the variable resistor 95, the signal is applied to the output of the controlled divider 31.

The converter 12 (FIG. 4) is intended for linearly adding the delayed, weakened, and filtered signals, applied from the unit 10 (FIG. 1), to the signals applied from the audiovisual unit 4, and the signals applied from the unit 7 via the unit 4.

The converter 12 is further intended for the operator to commutate in time all the received signals and direct them to respective recording channels with due regard for the number of responses and the time of reaction of the reference student to test signals.

Applied to the inputs $13_1$, $13_2$, $13_3$, $13_4$, and $13_5$ of the converter 12 are signals from the audiovisual unit 4. Applied to the input 14 are signals from the unit 10. The adder 35 (FIG. 4) linearly adds the single applied to the inputs $13_1$ and 14 of the unit 12. The signal applied to one of the inputs of the adder 35 is applied to the voltage divider composed of the resistor 97 and the resistor 99. Voltage is divided in proportion to the ratio between the resistance of the resistor 99 and the sum total of the resistances of the resistors 99 and 97.

The signal applied to the other input of the adder 35 is applied to the voltage divider composed of the resistor 98 and the resistor 99. Voltage is divided in proportion to the ratio between the resistance of the resistor 99 and the sum total of the resistances of the resistors 99 and 98.

Thus, picked up from the resistor 99, connected to the output of the adder 35, is a total signal proportional to the sum total of the signals applied to both inputs of the adder 35.

From the adder 35, the added signals are applied to the contact 37 of the signal commutator 36. With the aid of the commutator 36, the operator directs these signals to the output channels of the converter 12, corresponding to the outputs $15_2$ and $15_3$. A required time lag of commutation signals is effected by the operator switching at the necessary moments the units 1, 2, 3, and 7.

The output channels of the converter 12 are the following:

the functional background channel, corresponding to the output $15_1$;

the basic study information channel, corresponding to the output $15_3$;

- the auxiliary study information channel, corresponding to the output $15_2$;

- the service signal channel, corresponding to the output $15_4$.

The output signals of the converter 12 are applied to the unit 16 (FIG. 1) for recording singals on a carrier. The standard units 1, 2, 3, and 7 employed in the proposed system are standard-type audio and video tape recorders which reproduce preliminarily recorded signals.

The unit 16 operates in the multichannel signal recording mode.

Following the application of signals from the units 12, 24, 17, and 25 to the unit 16 for recording signals on a carrier, the latter unit records the following signals:
the audio signal of basic study information;
the audio signal of auxiliary study information;
the audio signal of functional background music;
the audio signal of suggestive signals;
the audio signal of speech service signals;
the audio service signals and signals of reflex reinforcement;
the audio signals of tests and instructions;
the audio signals of delayed reinforcement;
the audio signals of suggestive stimulation (the key speech signals);
the myostimulation signals;
the biostimulation signals;
the signals of bioreactions and responses of the reference student;
the video signal of study information;
the video signal of functional music-and-color background;
the video signal of suggestive and subsensor control and reflex reinforcement;

the video signal of tests and instructions.

According to the proposed method of forming and converting information for accelerated instruction, the above-mentioned signals are recorded on the carrier in the linearly added form through 8 audio channels and one video channel. The unit 19 reproduces all the signals recorded by the unit 16 through all the channels.

The biostimulation unit 17 (FIG. 5) is intended for biostimulating the electrically active points on the reference student's body in the course of check instruction. The multivibrator built around the transistors 40 and 41 generates square pulses at a frequency of 400 Hz. From the output of the multivibrator, the pulses are applied to the variable resistor 51 and the diode 52 intended for reducing a positive signal value to zero level, so that applied to the output 18 are pulses of negative polarity.

The contacts 53 of the relay shunt the output signal of the variable resistor 51 when there is no signal across the input of the unit 17.

As soon as there is a signal at the input of the unit 17, the relay 54 is actuated, the relay contacts 53 break, and a signal is applied to the output $18_1$ of the unit 17.

The variable resistor 51 selects a required level of signals applied to the output $18_1$ of the unit 17. These signals serve to electrically stimulate the electrically active points on the reference student's body. Via the input $18_3$, a signal is applied to the unit 17, which is then applied to the indicator built around the transistors 42 and 43.

When there is a signal at the base of the transistor 42, the light indicator 58 is actuated, and so is the relay 59. The relay contact 60 is closed, and there appears a signal at the output $18_2$, which is meant for thermostimulation of the electrically active points on the reference student's body.

The myostimulation unit 24 (FIG. 6) is intended for electrostimulation of the reference student's muscles in order to stimulate the latter's motor activity.

The pulse generator 61 generates square pulses at a frequency of 80 Hz, which pulses are applied to the input of the modulator 62.

The pulse generator 61 (FIG. 15) is a blocking generator generating pulses with an exponential trailing edge, at a frequency of 80 Hz.

The transformer 107, one of whose windings is connected to the collector circuit of the transistor 106, whereas its other winding is connected to the base of said transistor 106, produces positive feedback. As a result, there are produced undamped pulse signals in the collector circuit of the transistor 106. The resistors 101 and 102 ensure required direct-current operating conditions of the transistor 106. The capacitor 103 sets the required pulse signal frequency. The capacitors 104 and 105 provide for the required shape of the pulse signals and an exponential trailing edge of the pulses. From the output of the generator 61, the pulse signal is applied to the input of the modulator 62 (FIG. 6). Applied to the other input of the modulator 62 is a signal from the output of the detector 63. The input signals are applied to the bases of the transistors 109 (FIG. 16) and 110. The direct-current operating conditions of the transistor 109 are determined by the resistor 108. The resistance magnitude of the resistor 108 is selected so as to ensure minimum signal amplification by the transistor 110 in the absence of an input signal at the base of the transistor 109. The direct-current operating conditions of the transistor 110 are set by the resistor 111.

As a signal (the envelope of bioprocesses) is applied to the input of the transistor 109 from the output of the detector 63 (FIG. 6), the gain factor of the transistor 110 (FIG. 16) increases, and so does the pulse signal sent from the output of the unit 61. The amplification of the pulse signal depends upon the value of the bioprocess envelope. Thus, applied to the output of the modulator 62 is a train of pulses modulated by the bioprocess envelope.

The modulated pulses are applied from the output of the modulator 62 to the power amplifier 64 (FIG. 6) which amplifies the pulse signals. The detector 63 (FIG. 17) is intended for detecting biosignals and discriminating their envelope.

The signal applied to the input of the detector 63 is then applied via the capacitor 113 to the base of the transistor 114. The operating conditions of the transistor 114 are determined by a positive bias applied to the base of the transistor 114 via the resistor 115. This provides for linear amplification of only those input signals that have negative polarity, whereby detection is effected. The capacitor 116 integrates the detected signals and discriminates their envelope. The output signal is applied to the output of the detector 63 from the resistor 117, via the capacitor 118.

From the output of the detector 63, the signals are applied to the input of the modulator 62 (FIG. 6). The detected signal of bioprocesses of the reference student modulates the pulse train generated by the pulse generator 61.

A bioprocess envelope signal is applied to one of the inputs of the modulator 62 (FIG. 16) from the detector 63. Applied to the other input of modulator 62 are pulse signals from the output of the pulse generator 61. The input signals are applied to the bases of the transistors 109 and 110. The direct-current operating conditions of the transistor 109, determined by the resistor 108, are selected so as to ensure minimum amplification of the signal applied to the base of the transistor 110 and picked from the resistor 112 in the absence of an input signal across the base of the transistor 109. The operating conditions of the transistor 110 are set by the magnitude of the resistor 11. As an external signal (the envelope of bioprocesses) is applied to the input of the transistor 109, the gain factor of the transistor 110 increases, and the pulse signal is amplified, depending upon the magnitude of the signal of the bioprocess envelope. Thus, applied to the output of the modulator 62 is a pulse train-modulated by the bioprocess envelope.

From the output of the modulator 62, the modulated pulses are applied to the power amplifier 64 (FIG. 6) and amplified by the amplifier. The divider made up of the resistors 119 (FIG. 18) and 119' divides the voltage of the input signal which is then applied to the base of the transistor 120 which effects power amplification of the signal. The load of the transistor 120 is the transformer 121, the output signal being picked up from the secondary winding of the transformer 121. From the transformer 121, the signal is applied to the output of the amplifier 64, the signal being rectified with the aid of the diode 122. The output signal is then used for electrically stimulating the student's muscles.

From the output of the power amplifier 64, the signals are applied to the input of the unit 24 (FIG. 6) and then, via the units 16 (FIG. 1) and 19, to the biogram sensor 77 (FIG. 8) of the sensor unit 25.

The response and biosignal unit 22 (FIG. 7) is intended for recording the basic physiological processes of the reference student and his reactions to audiovisual signals. Its output $23_2$ is connected to the input of the biostimulation unit 17 (FIG. 1). The output $23_1$ is connected to the input of the miostimulation unit. The multichannel input of the unit 22 is connected to the multichannel output 25' of the sensor unit 25. One of the inputs of the response and biosignal unit 22 is connected to the input of the respective biopotential amplifier 65 (FIG. 7). The biopotential amplifier 65 (FIG. 19) has a symmetrical circuitry and comprises amplification stages placed in series. FIG. 19 shows one amplification stage of the biopotential amplifier 65. The transistors 126 and 127 function as emitter followers. The emitter followers are directly connected to the second stages built around a common emitter. The transistors 135 and 136 effect voltage gain of biopotentials. The symmetry in the circuitry of the biopotential amplifier 65 is necessary to suppress the cophasal interference due to the power mains.

The input biosignals, which are infralow-frequency signals, are applied via the capacitors 124 and 125 to the bases of the transistors 126 and 127. The operating conditions of the transistor 126 are set by the voltage divider composed of the resistors 131, 133, 134, and 130. The thermistor 130 accounts for thermal stabilization of the working point of the transistor 126. The operating conditions of the transistor 127 are set by the voltage divider composed of the resistors 132, 133, 134, and 130. The thermistor 130 also accounts for thermal stabilization of the working point of the transistor 127.

The output signals of the emitter followers built around the transistors 126 and 127 are picked up from the resistors 128 and 129 and applied to the bases of the transistors 135 and 136 which effect voltage gain of the signal. The voltage amplifier stage built around the transistors 135 and 136 has a negative feedback via the resistors 140 and 141, which accounts for its increased stability in operation. In order to stabilize the operating conditions, there is placed in the emitter circuits of the transistors 135 and 136 a divider made up of the resistors 137, 138, 139, and 147. The thermistor 147 incorporated in the divider accounts for thermal stabilization of the working point of the transistors 135 and 136. The output signals of the voltage divider are picked up from the resistors 142 and 143 and applied via the capacitors 144 and 145 to the output of the biopotential amplifier 65.

From the output of the biopotential amplifier 65, the signal is applied to the input of the operational amplifier 66 (FIG. 7) having the threshold filter placed in its feedback circuit, which filter 67 determines the frequency characteristic of the operational amplifier 66. With this feedback circuit, the operational amplifier 66 makes it possible to discriminate from the recorded electroencephalographic processes frequency components within the range of 0.5 to 8 Hz which are indicative of a drop in the general tone of the reference student, and components within the range of 10 to 30 Hz which are indicative of an improved general tone of the reference student.

From the output of the biopotential amplifier 65, the signal is applied to the base of the transistor 148 (FIG. 20) of the operational amplifier 66. The resistor 151 sets the direct-current operating conditions of the transistor 148. The load of the emitter follower built around the transistor 148 is the input resistor of the voltage amplification stage built around the transistor 149. The transistors 148 and 149 are directly interconnected. The resistor 150 serves to stabilize the operating conditions of the transistor 149. From the emitter of the transistor 148, the signal is applied to the base of the transistor 149. The transistor 149 effects voltage gain of the signal which is applied from the resistor 152 to the output of the amplifier 66.

Placed in the feedback circuit in parallel with the operational amplifier 66 (FIG. 7) is an RC band-pass filter 67. The band-pass filter 67 (FIG. 21) is a rejection filter which, because of appropriately selecting the resistances of the resistors 153, 154 and 158, and the capacitances of the capacitors 155, 156 and 157, may have a frequency characteristic with different resonance frequency and bandpass. The bandpass is selected within the ranges of 0.5 to 3, 4, to 7, 8 to 12, and 15 to 30 Hz. These frequencies correspond to the basic rhythms of man's encephalogram. With the filter 67 being placed in the feedback circuit of the operational amplifier 66, the latter functions as a frequency-selective amplifier. It is an active filter whose resonance frequency and bandpass are determined by the tuning frequency of the band-pass filter 67. The input signal is applied to the circuit comprising the capacitor 156, the resistor 158 and the capacitor 157, which is a frequency-dependent voltage divider whose transmission factor decreases with an increase in the frequency. The circuit comprising the resistor 153, the capacitor 155 and the resistor 154 is a frequency-dependent divider for the input signal, whose transmission factor increases with an increase in the frequency. The frequency at which the transmission factors of these two circuits are equal is the resonance frequency of the filter. The Q factor of such an active filter built around the operational amplifier 66 (FIG. 7) with the RC filter placed in parallel in its feedback circuit is proportional to the gain factor of the operational amplifier. The gain factor is, in turn, determined by resistance values of the resistors 152 (FIG. 20) and the resistors 153 (FIG. 21) and 154.

From the output of the operational amplifier 66 (FIG. 7), the signals are applied to the integrator 68 which integrates the filtered bioprocess signals.

Applied to the input of the integrator 68 (FIG. 22) via the capacitor 159 is the signal from the filter 67 (FIG. 7). The signal is applied to the base of the transistor 160 (FIG. 22) which functions as an emitter follower. The operating conditions of this stage are set by the voltage divider composed of the resistors 161 and 162. The output signal is power-amplified and applied from the emitter of the transistor 160 to the base of the transistor 164. Built around the transistor 164 is a voltage amplifier stage. The operating conditions of this stage are stabilized by the resistors 163 and 165. The stage effects linear signal amplification. From the output of the stage, which is the resistor 166, the amplified signal is applied via the capacitor 167 to the detector built around the diodes 168 and 169. The detector effects halfwave detection. The detected signal is applied to the reservoir capacitor 171. As the detected signal is applied to the reservoir capacitor 171, the latter's charge increases with time. Voltage across the capacitor rises correspondingly. With a weak signal at the input, the voltage rise across the capacitor is insignificant. The stronger the signal, the more rapidly increases voltage across the capacitor 171. The voltage across the capacitor 171 is amplified by the transistor 170 whose base is connected to the capacitor 171 and by the transistor 174 whose operating conditions are determined by the resistors 172 and 175. The load of the transistor 174 is the winding 176 of the relay which is actuated by a threshold signal corresponding to a predetermined magnitude of voltage across the capacitor 171. As the relay is actuated, the contacts 173 and 173" are closed and short the capacitor 171. The capacitor's charge is reduced to zero. The cycle is then repeated: as a detected signal is applied to the capacitor 171, voltage across said capacitor increases and, when it reaches the threshold level, it actuates the relay and closes the contacts 173 and 173". Thus, from the resistor 178 connected to the relay contact 173' there is applied to the output of the integrator 68 a pulse signal whose instantaneous frequency is determined by the intensity of the signal at the input of the integrator 68. Placed in parallel with the relay winding 176 is the capacitor 177. As a result, pulses at the output of the circuit under review have a constant duration determined by the capacitance of the capacitor 177, and a variable frequency that is dependent upon the intensity of the signal at the input of the integrator 68.

From the output of the integrator 68, the signals are applied to the threshold device 69 (FIG. 7) which is actuated when the signal applied from the integrator 68 reaches a preset value.

From the output of the integrator 68, the signal is applied in the form of a pulse signal to the input of the threshold device 68. The pulses' duration is constant, but their repetition frequency varies. The amplifier stage built around the transistor 179 (FIG. 23) amplifies the input signal which is applied to the base of the transistor 179 and is picked up from its emitter and the resistor 184. The operating conditions of the transistor 179 are determined by the divider composed of the resistors 180 and 181. The capacitor 182 is a reservoir capacitor. It accumulates and averages in time the mean value of the constant component of the input pulse signal. As the pulse duration is constant, and as only the pulse repetition frequency varies, the mean value of the constant component is determined by the pulse repetition frequency, i.e. the initial intensity of the signal at the input of the integrator 68 (FIG. 7). This constant voltage is applied to the comparison circuit built around the transistor 183 (FIG. 23). Applied to the emitter of the transistor is the signal from the reservoir capacitor 182; applied to the base of the transistor is the threshold voltage value determined by the divider made up of the resistors 187 and 189 and a variable resistor 188. If the voltage across the capacitor 182 $a$ is in excess of the threshold value determined by the variable resistor 188, the transistor 183 is snapped into operation. As this takes place, the output signal of the transistor 183 is applied to the base of the transistor 185. The transistor 185 and the transistors 191 and 194 are directly interconnected and make up a three-stage d.c. amplifier. The operating conditions of the d.c. amplifier are stabilized by the resistors 186, 192, and 193. The resistor 190 is the load of the first stage of the d.c. amplifier built around the transistor 185. The d.c. amplifier amplifies the output signal of the threshold comparison circuit of transistor 183, which amplification is necessary to actuate the relay 195. Thus, the operation of the threshold circuit actuates the relay 195. The contacts 196 of the relay are closed, and a signal is applied to the output of the circuit 69. The capacitor 197 ensures spark quenching at the contacts.

The output signal of the threshold device 69 (FIG. 7) is applied to the output $23_2$ of the response and biosignal unit 22, which is connected to the input of the biostimulation unit 17 (FIG. 1). The signal from the output $23_2$ actuates the biostimulation unit 17; the signal from the output $23_1$ controls the myostimulation unit 24.

The sensor unit 25 (FIG. 8) is intended for picking up bioinformation from the reference student and transmitting stimulating signals to said reference student.

The sensor unit 25 is connected to the biostimulation unit 17 (FIG. 1), the response and biosignal unit 22, the check reproduction unit 19, and the recording unit 16. The sensor 70 (FIG. 8) records the electrocardiogram of the reference student. The sensor 71 records his electroencephalogram. The sensor 72 records the reference student's pneumogram. The sensor 73 records the reference student's movements. The needle sensor 74 serves to electrically stimulate the electrically active points on the reference student's body. The sensor 75 serves to thermally stimulate the electrically active points on the reference student's body. The sensor 76 records actograms (responses) of the reference student. The sensor 77 serves to electrically stimulate the student's muscles in order to enhance his motor activity. The common electrode 78 serves to register signals in the course of detecting electrically active points.

The process of forming, converting and recording information with simultaneous check instruction of a reference student is effected as follows. After the preliminary preparation, formation and recording of signals by the study information unit 1, the control and accompaniment signal unit 2, the test and instruction unit 3, and the unit 7 of suggestive and subsensor control and reflex reinforcement signals, a general program of the suggestocybernetic instruction course is worked out, which includes all the above-mentioned types of session. The instruction time and conditions may vary depending upon the subject of study. On the average, the total instruction time with the use of the suggestocybernetic method of instruction is one order less than that required by the conventional teaching techniques. Check instruction of reference students must be carried out in specially designed and equipped premises with a stylized interior. Provision must be made for acoustically equipped studios for reproduction of audiovisual signals, rooms for relaxation and suggestively controlled sleep, rooms for physiological checks, active rest, and controlling the student's state, as well as premises for equipment and all that is needed for everyday life of the students.

A reference student is given a medical checkup and tested. Check instruction of the reference student takes place on premises of the type that has been described above. Sensors are attached to the reference student's body. A check instruction course corresponds to a subsequent instruction course for other students who are supposed to cover a given program. The check instruction course includes recordings of all the types of study session. Instruction sessions are recorded in an order corresponding to the course of instruction. A program of sessions for a particular day must include a biostimulation session a relaxation session, passive assimilation sessions, sessions of activization of passively assimilated material, sessions of programmed active rest, a session of suggestively controlled sleep to take place during day hours, sessions of feeding information to the rhythm of bioprocesses, sensomotor instruction sessions, assimilation check sessions, a suggestively controlled nigh sleep session, and a suggestive stimulation session. In the course of recording, respective sensors record the reference student's responses and biosignals. If a repeated reproduction of a recorded session is required in the course of instruction, a finished recording is reproduced for the reference student. In the course of the instruction period, each session is repeated on different days until the number of responses (bioreactions) of the reference student, recorded by the response and biosignal unit 22 during each session, is higher than 75 to 85 percent of the number of lexical units (linguistic constructions) contained in the session.

In the process of instructing a reference student, the system of the present invention reproduces converted information signals and simultaneously records these signals on video and audio tape recorders. In this case the signal carrier is magnetic tape. It is possible to realize the proposed method of forming and converting information for accelerated instruction by using a different embodiment of the system. For example, the video tape recorders may be replaced by cinema equipment and slide projectors provided with means for simultaneous sound track reproduction. Some individual units may have different circuitries (provided that the general block diagram of the system remains unchanged). The function of the converted information signal carrier may be performed by films and slides in combination with magnetic tape.

The information that has been converted and recorded by the proposed system for accelerated instruction of other students is used in a way similar to the check instruction of the reference student, at premises specially designed and equipped for mass-scale suggestocybernetic accelerated instruction.

The information converted and recorded with the use of the proposed method by the proposed system in the course of check instruction of the reference student can subsequently be used for mass-scale instruction of students whose test response parameters are close to those of the reference student. One program can be used on the average for teaching 15 to 25 percent of the entire student body. Teaching of persons having different parameters requires the selection of programs recorded for reference students whose test performance is similar to the given group of students. Thus, large-scale instruction calls for a collection of specially selected recordings.

The proposed method of converting, forming and recording information, and the system for effecting this method, employed in combination with the suggestocybernetic method of accelerated instruction in a foreign language without a tutor make it possible to cover a language course (English, French, German and other languages) containing 3,000 to 4,000 words within an average of 10 to 12 days (80 to 100 hours).

A course of Japanese containing 1,000 to 1,300 hieroglyphs is covered on the average within 15 to 20 days.

A typist student develops a typing speed of 140 to 160 strokes per minute within 3 to 4 days.

Reading speed is doubled within 2 to 3 days of training with the same degree of material assimilation.

A computer programming course is covered within 4 to 6 days of training.

Theoretical courses, that normally extend over a whole term at college or university, are covered during 2 to 4 days.

An autotraining course is mastered within 1 to 3 days.

The proposed method and system help to carry out instruction in complicated decision making, enhance creative activity as a result of accelerated instruction in the "generation of ideas", and, finally, make it possible to quickly train control system operators.

Delayed assimilation checks reveal good assimilation (with no practice in a given field over a period of one year, a student does not forget more than 40 to 50 percent of the information covered during instruction).

Medical checkups of students do not show any excessive strain throughout the instruction course.

Apart from their application in accelerated instruction in different field and professions, the method and system of the present invention help to enhance creative activity, are highly effective in education and upbringing, and prove to be powerful psychotherapeutical and psychohygienic tools.

What is claimed is:

1. A method of forming and converting information for accelerated instruction with multichannel recording of said information on a carrier and simultaneous instruction of a reference student, including the steps of
   a. forming, from educational aids, initial synchronized audiovisual signals of basic and auxiliary study information;
   b. forming audiovisual signals of functional background to the rhythm of the student's bioprocesses;
   c. forming service signals for controlling the process of reproduction of signals recorded on said signal carrier;
   d. forming test signals and instruction signals;
   e. working out a suggestive formula of suggestive and subsensor control;
   f. forming, in accordance with said suggestive formula, suggestive and subsensor control signals in the form of speech signals to the rhythm of the student's bioprocesses;
   g. forming, in accordance with said suggestive and subsensor control signals, reflex reinforcement signals;
   h. forming suggestive and subsensor stimulation signals;
   i. registering responses and bioreactions of said reference student;
   j. measuring, with reference to said test signals, the conscious perception threshold and the time of reaction of said reference student by recording his responses and bioreactions;
   k. frequency-filtering said audio signals of said basic and auxiliary study information;
   l. delaying in time, within the limits of a syntagma, said audio signals of basic and auxiliary study information;
   m. changing the intensity of said delayed audio signals to the perception threshold level of said reference student, in accordance with the number of the latter's responses to said test signals;
   n. linearly adding said delayed and weakened audio signals to said initial audiovisual signals of basic and auxiliary study information, said audiovisual signals of functional background, and said signals of suggestive and subsensor control and reflex reinforcement;
   o. commutating said added signals in time and with respect to recording channels with said suggestive and subsensor stimulation signals, suggestive control signals, and test signals, with due regard for the time of reaction of said reference student;
   p. forming signals for biostimulating electrically active points on said reference student's body;
   g. synchronizing said audiovisual signals of said basic and auxiliary study information, said suggestive and subsensor control signals, and said audiovisual signals of functional background with the rhythm of physiological processes of said reference student;

r. forming - from said formed audiovisual signals of basic and auxiliary study information, said audiovisual signals of functional background, said suggestive and subsensor control signals, said reflex reinforcement signals, said test and instruction signals, said suggestive and subsensor stimulation signals, said signals delayed and weakened to the perception threshold level of said reference student, said signals synchronized with the rhythm of bioprocesses of said reference student, commutated in time and with respect to the recording channels - signals of sessions of passively assimilating information, signals of sessions of activization of passively assimilated material, signals of sessions of assimilating information and checking to the rhythm of the student's bioprocesses, signals of programmed relaxation sessions, signals of sessions of suggestively stimulating the state of said student, signals of sensomotor training sessions, signals of sessions of biostimulation of electrically active points on the body of said student, signals of suggestively controlled sleep sessions, and signals of programmed active rest sessions;

s. registering responses and bioreactions of said reference student to said formed signals of said sessions;

t. recording all said formed and converted signals on the carrier simultaneously with recording the responses and bioreactions of said reference student;

u. using said signals recorded on the carrier, as these signals are being reproduced, for accelerated instruction of students whose performance, as regards the number of responses and bioreactions to test signals, is similar to that of said reference student.

2. A method as claimed in claim 1, whereby a. said biosignals of said reference student, recorded on the carrier, are additionally converted into signals for electrically stimulating the student's muscles;

b. as the signals for electrically stimulating said student's muscles are being reproduced, they are used to stimulate the motor activity of the student in the course of instruction by sending said signals to sensors attached to said student's body.

3. A system for effecting the proposed method of forming and converting information for accelerated instruction, comprising:

a. a study information unit means intended for forming synchronized audiovisual signals of basic and auxiliary study information; outputs of said study information unit means;

b. a unit means of control signals and accompaniment signals, intended for forming audiovisual signals of functional background and service signals for controlling reproduction of said audiovisual signals of said basic and auxiliary study information; outputs of said unit means of control signals and accompaniment signals;

c. a test and instruction unit means; an output of said test and instruction unit means;

d. an audiovisual unit means intended for presenting said audiovisual signals of basic and auxiliary study information, audiovisual signals of functional background, and test and instruction signals in a suggestive form; inputs and outputs of said audiovisual unit means, said inputs of said audiovisual unit means being connected to said outputs of said study information unit means, said control and accompaniment signal unit means, and said test and instruction unit means, respectively;

e. a unit means suggestive and subsensor control and reflex reinforcement of suggestive and subsensor signals, intended for forming audiovisual signals of subsensor and suggestive control from said formed suggestive formulas recorded in the form of speech signals, for forming said synchronized audiovisual signals of reflex reinforcement of said suggestive and subsensor formulas, forming said speech signals of suggestive and subsensor stimulation in the form of key speech signals; outputs of said unit means of suggestive and subsensor control and relex reinforcement of suggestive and subsensor signals; said output of said unit means of suggestive and subsensor control being connected to said input of the audiovisual unit means;

f. means for providing student responses, a delayed reinforcement unit means intended for delaying in time said speech signals of basic and auxiliary study information within the limits of a syntagma, frequency filtering these signals and weakening them to the perception threshold of said reference student, in accordance with the number of said student's responses to said test signals; an input and an output of said delayed reinforcement unit means being connected to said output of said study information unit means;

g. a signal converter means having channels, intended for linearly adding said delayed, weakened and filtered signals to said signals of said audiovisual unit means and said signals of said unit means of suggestive and subsensor control and reflex reinforcement of said suggestive formulas, commutating in time all said received signals and directing them to said channels with due regard for the number of responses and the time of reaction of said reference student to test signals; six inputs and four outputs of said signal converter means; five of said inputs of said signal converter means being connected to said respective outputs of the audiovisual unit means, the sixth of said inputs being connected to said output of said delayed reinforcement unit means;

h. a unit means for recording signals on a carrier, intended for recording on said carrier said converted signals synchronously with the rhythm of said reference student's physiological processes and his bioreactions in the course of check instruction; inputs and outputs of said unit means for recording signals on a carrier; some of said inputs of said unit means for recording signals on a carrier being connected to said respective outputs of said signal converter means;

i. a biostimulation unit means intended for stimulating electrically active points on said reference student's body; inputs and outputs of said biostimulation unit means; said outputs of said biostimulation unit means being connected to respective inputs of said unit means for recording signals on a carrier;

j. a check reproduction unit means intended for transmitting said signals to said reference student for check instruction and for instructing students whose performance, as regards the reactions to said test signals, is similar to that of said reference student; a multichannel input and an output of said reproduction unit means; said multichannel input of said reproduction unit means being connected to the multichannel output of said unit means for recording signals on a carrier, whereas output audiovisual signals are reproduced for said reference student;

k. a response and biosignal unit means intended for registering the basic physiological processes of said reference student and his reactions to signals of said check reproduction unit means; inputs and outputs of said response and biosignal unit means; one of said outputs of said response and biosignal unit means being connected to said input of said biostimulation unit means;

l. a sensor unit means intended for picking up bioinformation from said reference student and transmitting stimulating signals to said reference student; inputs and outputs of said sensor unit means; some of said outputs being connected to said inputs of said response and biosignal unit means, one of the other outputs being connected to said input of said biostimulation unit means, a third output being connected to the input of said unit means for recording signals on a carrier, the inputs of said sensor unit means being connected to the outputs of said check reproduction unit means.

4. A system as claimed in claim 3, comprising a myostimulation unit means intended for electrically stimulating said reference student's muscles in order to enhance the motor activity of said reference student; an input and an output of said myostimulation unit means; said input of said myostimulation unit means being connected to said output of said response and biosignal unit means, whereas said output is connected to said input of said unit means for recording signals on a carrier.

* * * * *